(12) United States Patent
Cheng

(10) Patent No.: US 11,052,933 B2
(45) Date of Patent: Jul. 6, 2021

(54) MOVING CARRIER AND FOLDING METHOD THEREOF

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 25 days.

(21) Appl. No.: 16/502,769

(22) Filed: Jul. 3, 2019

(65) Prior Publication Data

US 2020/0010105 A1 Jan. 9, 2020

Related U.S. Application Data

(60) Provisional application No. 62/694,237, filed on Jul. 5, 2018.

(51) Int. Cl.
*B62B 7/06* (2006.01)
*B62B 9/26* (2006.01)
*B62B 7/00* (2006.01)

(52) U.S. Cl.
CPC ............ *B62B 7/06* (2013.01); *B62B 7/008* (2013.01); *B62B 9/26* (2013.01); *B62B 2202/42* (2013.01)

(58) Field of Classification Search
CPC .. B62B 7/06; B62B 7/008; B62B 9/26; B62B 2202/42
See application file for complete search history.

(56) References Cited

U.S. PATENT DOCUMENTS 8,157,273 B2 * 4/2012 Bar-Lev .................. B62B 7/142
280/47.39
2013/0270800 A1 * 10/2013 Chiang ................... B62B 7/142
280/658

FOREIGN PATENT DOCUMENTS

| CN | 102632916 A | 8/2012 |
| CN | 202518316 U | 11/2012 |
| CN | 202518317 U | 11/2012 |

* cited by examiner

*Primary Examiner* — Bryan A Evans
(74) *Attorney, Agent, or Firm* — Muncy, Geissler, Olds & Lowe, P.C.

(57) ABSTRACT

A moving carrier comprises a bottom frame assembly, a first support member and a link assembly. A first end portion of the first support member is connected with the bottom frame assembly. The link assembly includes a link member, a first connect member, a second connect member, and two adapter members. The link member is disposed at a second end portion of the first support member. The first connect member and the second connect member are disposed on the link member and connected to the second end portion through the link member. The adapter members are disposed corresponding to ends of the first connect member and the second connect member, and each adapter member has an adapter portion. In the process of changing positions of the first connect member and the second connect member relative to the link member, the adapter portions are oriented to the same direction.

20 Claims, 26 Drawing Sheets

MOVING CARRIER AND FOLDING METHOD THEREOF

CROSS REFERENCE TO RELATED APPLICATIONS

The non-provisional patent application claims priority to U.S. provisional patent application with Ser. No. 62/694,237 filed on Jul. 5, 2018. This and all other extrinsic materials discussed herein are incorporated by reference in their entirety.

BACKGROUND

Technology Field

The present disclosure relates to a moving carrier and, in particular, to a moving carrier and a folding method thereof that can change the relative positions of two carry members.

Description of Related Art

The moving carrier with two carry members, such as a double-seat stroller, can be used for carrying two infants at the same time. Generally speaking, the two seats of the conventional double-seat stroller are fixed and cannot be adjusted. The two infants are usually side by side when sitting in the stroller. In another case, one infant is in front and the other is in the back. In these conventional double-seat strollers, the infants both face forwardly, and the parent pushes the stroller from behind. The users cannot change or adjust the positions of the two seats by themselves, and the parents cannot immediately see the baby's facial expressions or interact with the babies.

SUMMARY

An objective of this disclosure is to provide a moving carrier and a folding method thereof. The moving carrier of this disclosure has two carry members, and the positions of the carry members are changeable. Accordingly, the relative positions of the two carry members can be changed according to the requirement of the user, thereby satisfying various requirements of the users. In addition, the folding method of the moving carrier of this disclosure can make the moving carrier become smaller (smaller occupied space), which can facilitate the storage and carrying of the moving carrier.

To achieve the above objective, the disclosure provides a moving carrier, which comprises a bottom frame assembly, a first support member, and a link assembly. The first support member has a first end portion and a second end portion, and the first end portion is connected with the bottom frame assembly. The link assembly comprises a link member, a first connect member, a second connect member, and two adapter members. The link member is disposed at the second end portion of the first support member. The first connect member and the second connect member are disposed on the link member and connected to the second end portion of the first support member through the link member. The adapter members are disposed corresponding to the ends of the first connect member and the second connect member, and each of the adapter members has an adapter portion. In the process of changing positions of the first connect member and the second connect member relative to the link member, the adapter portions are oriented to the same direction.

In one embodiment, the moving carrier comprises two of the link assemblies disposed at two sides of the moving carrier.

In one embodiment, in the process of changing the positions of the first connect member and the second connect member relative to the link member, the first connect member and the second connect member maintain in parallel.

In one embodiment, each of the first connect member and the second connect member comprises a third end portion and a fourth end portion, the third end portion of the first connect member is located corresponding to the third end portion of the second connect member, the fourth end portion of the first connect member is located corresponding to the fourth end portion of the second connect member, one of the two adapter portions connects to both of the third end portion of the first connect member and the third end portion of the second connect member, and the other one of the two adapter portions connects to both of the fourth end portion of the first connect member and the fourth end portion of the second connect member.

In one embodiment, the link member comprises a link portion, and the first connect member and the second connect member are pivotally connected to the link portion.

In one embodiment, the link assembly further comprises a third connect member, one end of the third connect member connects to the link member, and the other end of the third connect member is slidingly disposed on the first connect member.

In one embodiment, the link assembly further comprises a position member, the first connect member further comprises a sliding track, the position member connects to the other end of the third connect member, and the third connect member is slidingly disposed on the sliding track through the position member.

In one embodiment, the first connect member further comprises a plurality of position holes, the position member comprises a position portion, and the position portion is disposed corresponding to one of the position holes.

In one embodiment, the position member further comprises an elastic member, the position portion is connected with the elastic member, and the position portion can be inserted into the position hole via the elastic member.

In one embodiment, the position holes are separated with nonequivalent intervals.

In one embodiment, the moving carrier further comprises at least one carry member, and the carry member has a connect portion disposed at one side of the carry member and disposed corresponding to the adapter portion.

In one embodiment, the carry member is a seat, a shelf, a carrycot, or a storage basket.

In one embodiment, the moving carrier comprises two of the carry members, and the carry members are in different types.

In one embodiment, the moving carrier further comprises a second support member crossingly connected with the first support member, and the second support member comprises a fifth end portion connected with the bottom frame assembly.

In one embodiment, the moving carrier further comprises a handlebar frame, and the second support member further comprises a sixth end portion connected with the handlebar frame.

In one embodiment, the bottom frame assembly comprises a bottom frame, at least one front wheel assembly, two rear wheel assemblies and a rear wheel axle, the at least one front wheel assembly is disposed on the bottom frame, the first end portion of the first support member is connected with the rear wheel axle, the rear wheel axle is connected with the bottom frame, and the two rear wheel assemblies are disposed at two ends of the rear wheel axle.

To achieve the above objective, the present disclosure also provides a folding method of a moving carrier. The moving carrier comprises a bottom frame assembly, a first support member, a link assembly, a second support member, and two carry members. The first support member has a first end portion and a second end portion, and the first end portion is connected with the bottom frame assembly. The link assembly is disposed corresponding to the first support member, and the link assembly is connected with the second end portion of the first support member. The second support member and the first support member are crossingly connected, and the second support member and the first support member are connected with the bottom frame assembly. The two carry members are correspondingly disposed at two ends of the link assembly. The folding method comprises: separating the two carry members from the link assembly; folding the second support member about a folding pivot portion of the second support member toward the bottom frame assembly; and continuously pushing the folded second support member toward the bottom frame assembly until the second support member is parallel to the bottom frame assembly.

In one embodiment, the link assembly comprises a link member, a first connect member, a second connect member, and two adapter members, the link member is disposed at the second end portion of the first support member, the first connect member and the second connect member are disposed on the link member and connected to the second end portion of the first support member through the link member, the adapter members are disposed corresponding to the ends of the first connect member and the second connect member, each of the adapter members has an adapter portion, and in the process of folding the moving carrier, the adapter portions are oriented to the same direction.

In one embodiment, in the process of folding the moving carrier, the first connect member and the second connect member remain in parallel to each other.

In one embodiment, in the step of continuously pushing the folded second support member toward the bottom frame assembly, the second support member drives the first support member and the link assembly to move toward the bottom frame assembly.

As mentioned above, in the moving carrier of this disclosure, the link member of the link assembly is disposed at the second end portion of the first support member, the first connect member and the second connect member are disposed on the link member and connected to the second end portion of the first support member through the link member, the adapter members are disposed corresponding to the ends of the first connect member and the second connect member, and each of the adapter members has an adapter portion. In the process of changing positions of the first connect member and the second connect member relative to the link member, the adapter portions are oriented to the same direction. This structural design makes it possible to change the relative positions of two carry members of the moving carrier based on the requirement of the user, thereby satisfying various requirements of the user. In addition, the folding method of the moving carrier of this disclosure can make the moving carrier become smaller (smaller occupied space), which can facilitate the storage and carrying of the moving carrier.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

In order to clearly describe the connections and structure of the moving carrier of this disclosure, the reference drawings of the following embodiments mostly show the framework of the moving carrier only, and the soft pads of the carry members (e.g. the seats) are not shown.

Figure 1:
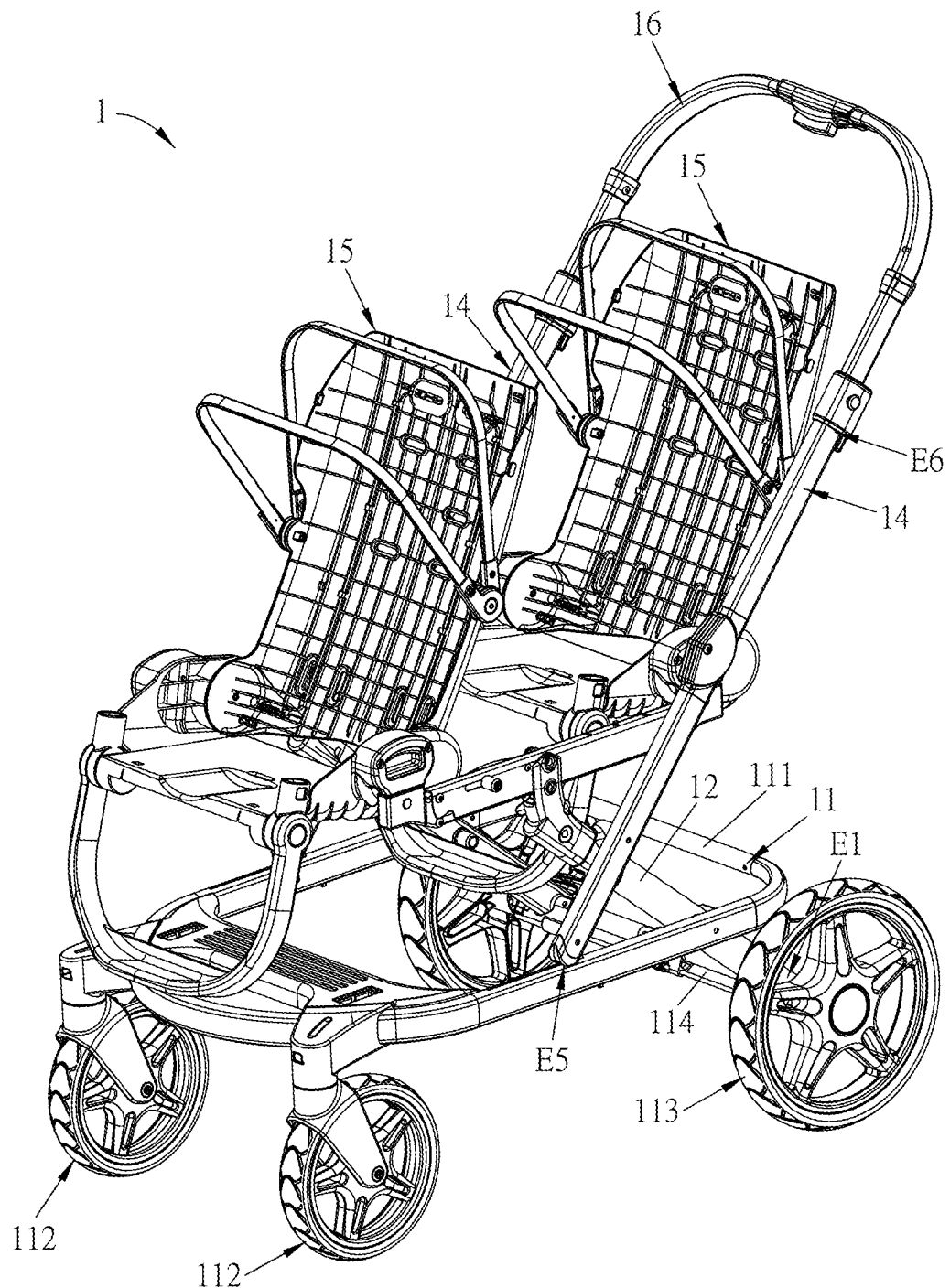
FIG. 1 is a schematic diagram showing a moving carrier according to an embodiment of this disclosure.
Figure 2A:
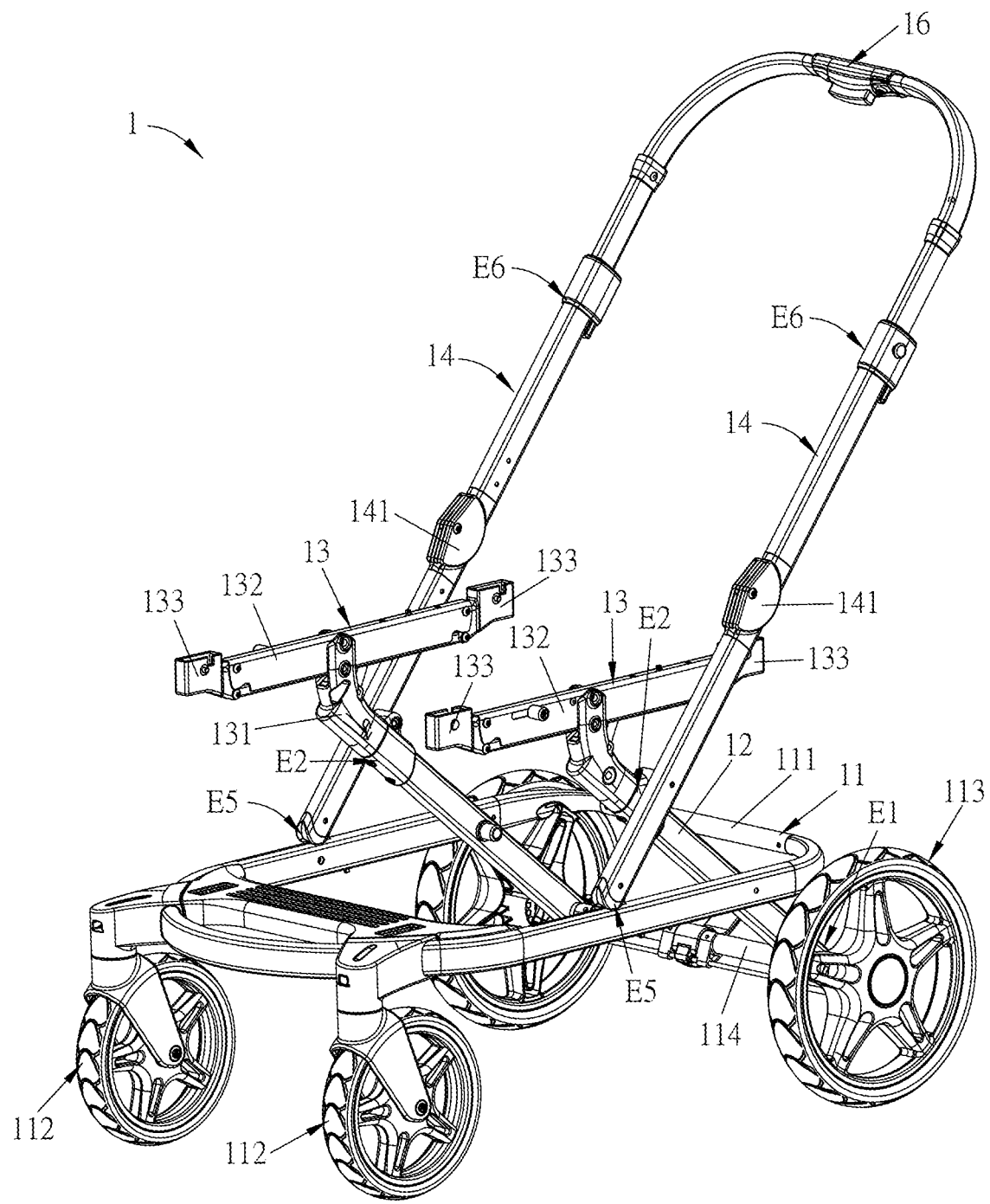
FIG. 2A is a schematic diagram showing the moving carrier of FIG. 1 without the carry members.

FIG. 1 is a schematic diagram showing a moving carrier 1 according to an embodiment of this disclosure, and FIG. 2A is a schematic diagram showing the moving carrier 1 of FIG. 1 without the carry members (seats). The moving carrier 1 is a double-seat stroller as an example.

As shown in FIGS. 1 and 2A, the moving carrier 1 comprises a bottom frame assembly 11, a first support member 12, and a link assembly 13. In addition, the moving carrier 1 further comprises a second support member 14, at least one carry member 15, and a handlebar frame 16. In this embodiment, the moving carrier 1 comprises two first support members 12, two link assemblies 13, two second support members 14, and two carry members 15. The two link assemblies 13 are located at two sides of the moving carrier 1 and correspondingly disposed on the two first support members 12, and the two carry members 15 are disposed on the two link assemblies 13.

The bottom frame assembly 11 comprises a bottom frame 111, at least one front wheel assembly 112, two rear wheel assemblies 113, and a rear wheel axle 114. The at least one front wheel assembly 112 and the two rear wheel assemblies 113 are disposed on the bottom frame 111. The front wheel assembly 112 and the rear wheel assemblies 113 are individually connected with the bottom frame 111. To be noted, the term "connect" can be implemented as "fixing" so that the connected objects cannot be relatively moved or rotated, or as "freely connecting" so that the connected objects can be relatively moved or rotated. In addition, the term "connect" can be implemented as directly connecting or indirectly connecting (connecting with other components), and this disclosure is not limited. In this embodiment, the bottom frame 111 forms a closed bottom frame structure, and the two front wheel assemblies 112 and the two rear wheel assemblies 113 are connected to the front side and the rear side of the bottom frame 111, respectively. Of course, in other embodiments, the moving carrier may have one front wheel assembly 112 and two rear wheel assemblies 113, or two front wheel assemblies 112 and one rear wheel assembly 113, and this disclosure is not limited thereto. In this embodiment, the two front wheel assemblies 112 are individually fixed on the bottom frame 111, and the two rear wheel assemblies 113 are indirectly connected with the bottom frame 111. In some embodiments, the closed bottom frame 111 can be installed with a storage member having a storage space (e.g. a storage bucket), so that the user can put any suitable object therein.

The first support member 12 has a first end portion E1 and a second end portion E2, and the first end portion E1 is connected with the bottom frame assembly 11. In this embodiment, the first end portion E1 of the first support member 12 is connected (fixed) to the rear wheel axle 114 of the bottom frame assembly 11, the rear wheel axle 114 is connected with the bottom frame 111, and the two rear wheel assemblies 113 are disposed at two ends of the rear wheel axle 114.

The second support member 14 is crossingly connected with the first support member 12. The second support member 14 comprises a fifth end portion E5 and a sixth end portion E6. The fifth end portion E5 is connected with the bottom frame 111 of the bottom frame assembly 11, and the sixth end portion E6 is connected with the handlebar frame 16. In this embodiment, the sixth end portions E6 of the second support members 14 are correspondingly connected with the two ends of the arc handlebar frame 16, respectively. In some embodiments, a shelf (e.g. a cup holder) can be disposed on the handlebar frame 16, so that the user can place a suitable object thereon.

Figure 2B:
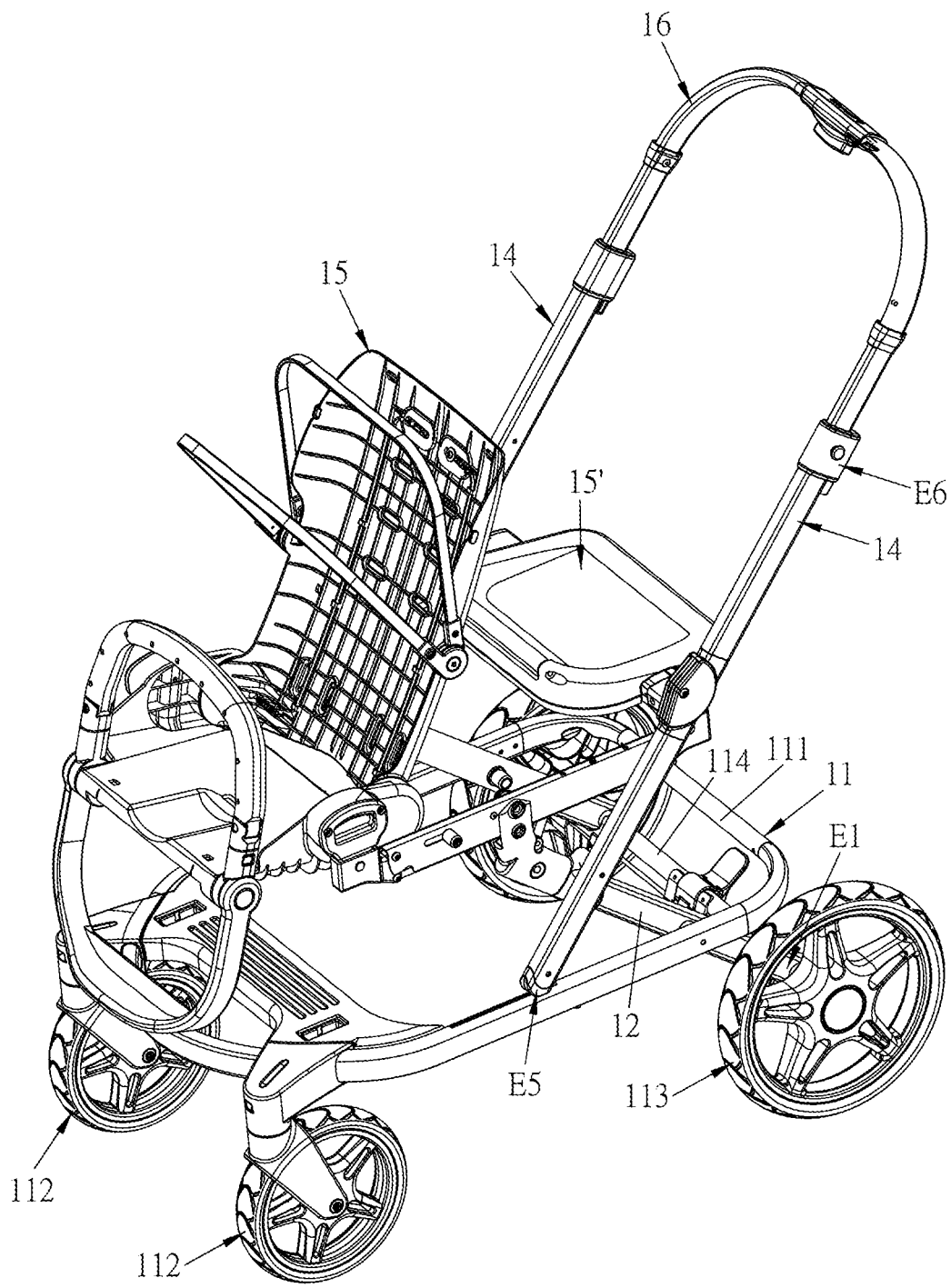
FIG. 2B is a schematic diagram showing a moving carrier according to another embodiment of this disclosure.
Figure 8:
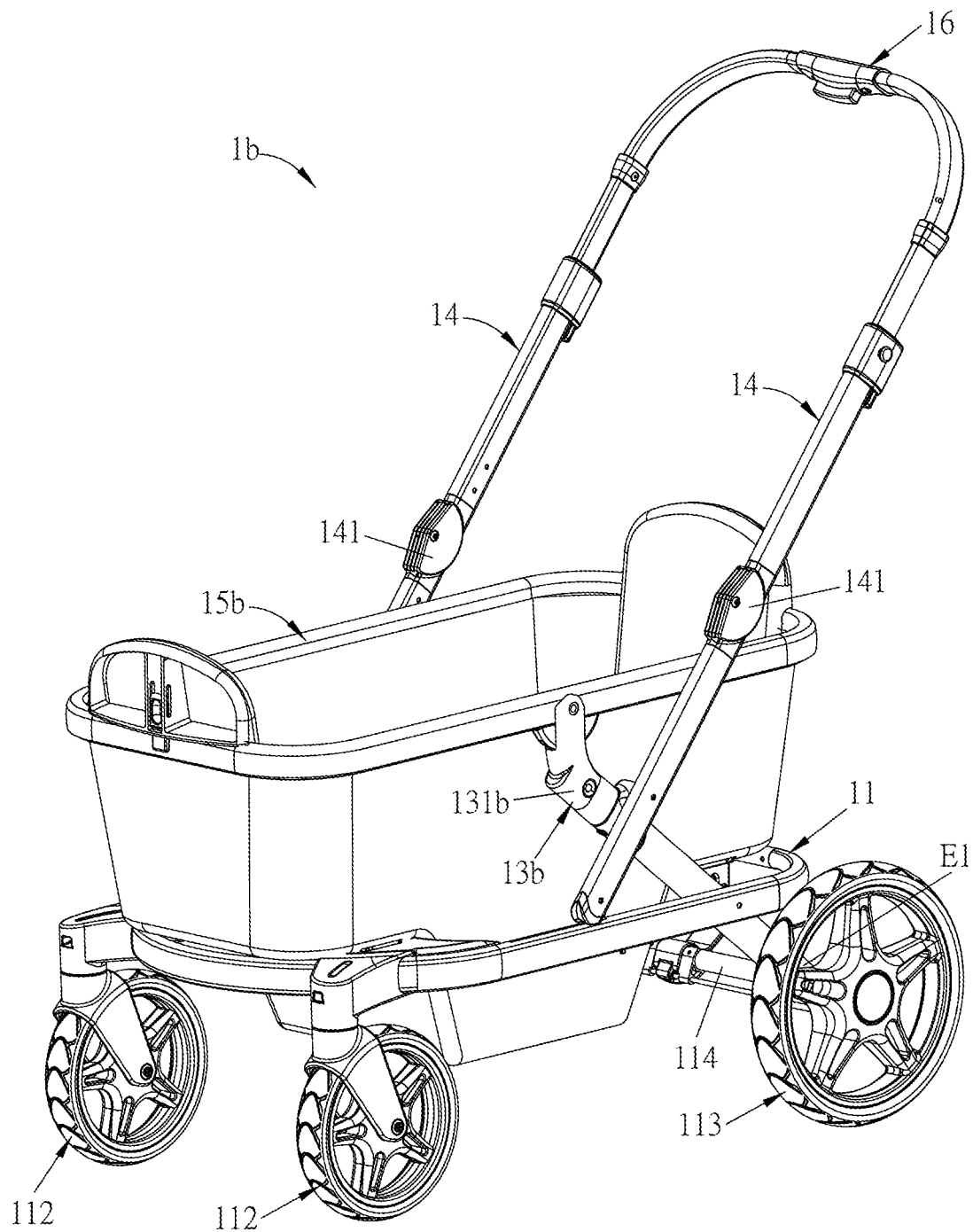

The carry members 15 are disposed on the first support members 12 through the link assemblies 13 as shown in FIG. 1. Herein, the two carry members 15 can be the same type or different types, and this disclosure is not limited. In this embodiment, the two carry members 15 are backless seats, shelves, carrycots, or storage baskets. Alternatively, as shown in FIG. 2B, one carry member 15 is a seat with a back, and the other carry member 15' is a backless seat. The carry members 15 can be any combination of the backless seat, shelf, carrycot, and storage basket depending on the requirement of the user, and this disclosure is not limited. If the two carry members 15 are both seats, the orientations of the seats can be adjusted based on the requirement of the user. For example, two infants sitting on the carry members 15 can both face forwardly (the direction toward the front wheel assembly 112), both face backwardly (the direction toward the rear wheel assembly 113), or be one facing forwardly and one facing backwardly. In addition, if the carry member 15 is a storage basket, the moving carrier can be used as a trailer or a pet stroller. To be noted, the term "storage basket" is an object having a bottom and a wall around the edge of the bottom, thereby forming a center accommodating space for storage. For example, as shown in FIG. 8, the carry member 15b of the moving carrier 1b is a typical storage basket of this disclosure.

Figure 3A:
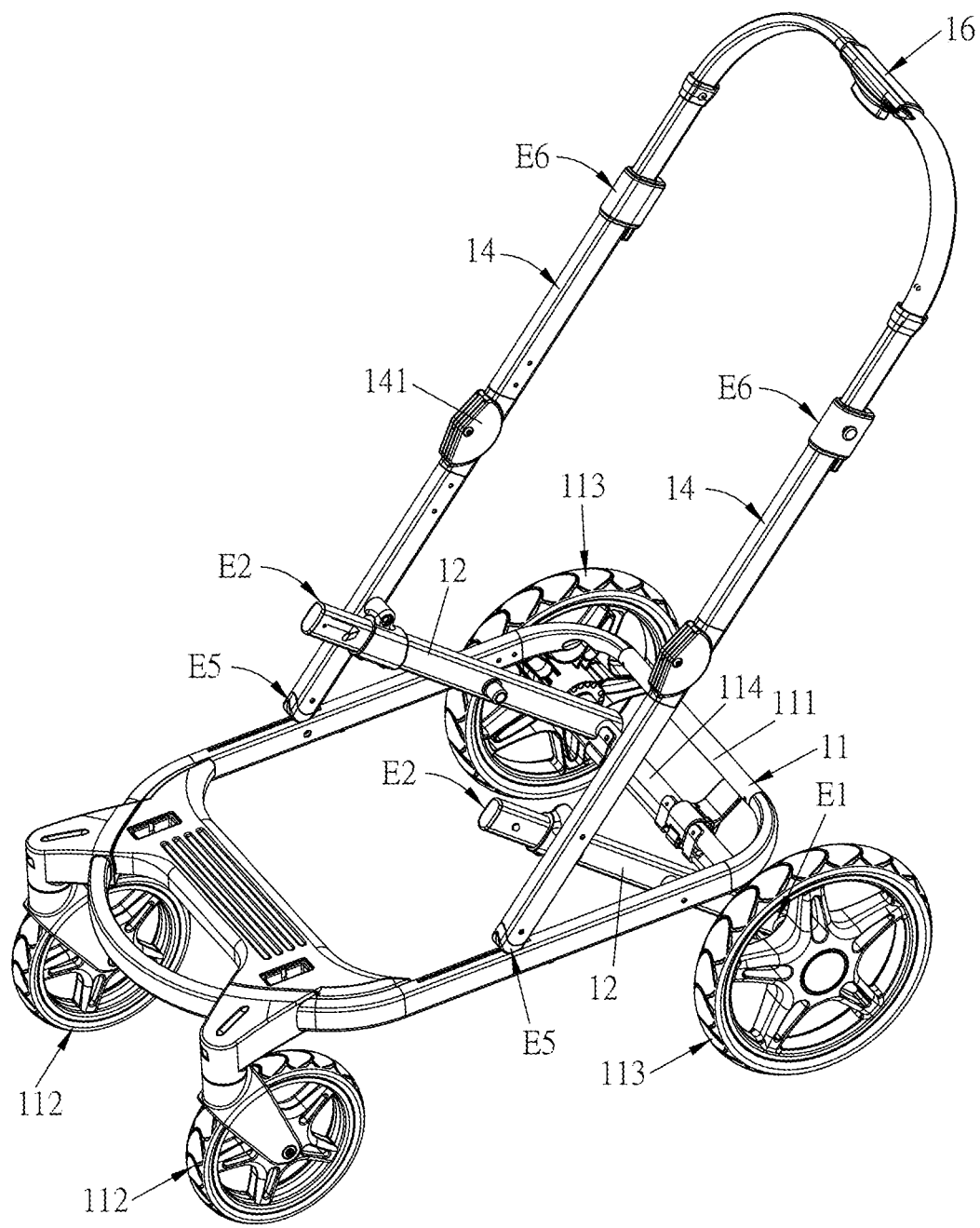
FIG. 3A is a schematic diagram showing the moving carrier of FIG. 2A without the link assembly.
Figure 3B:
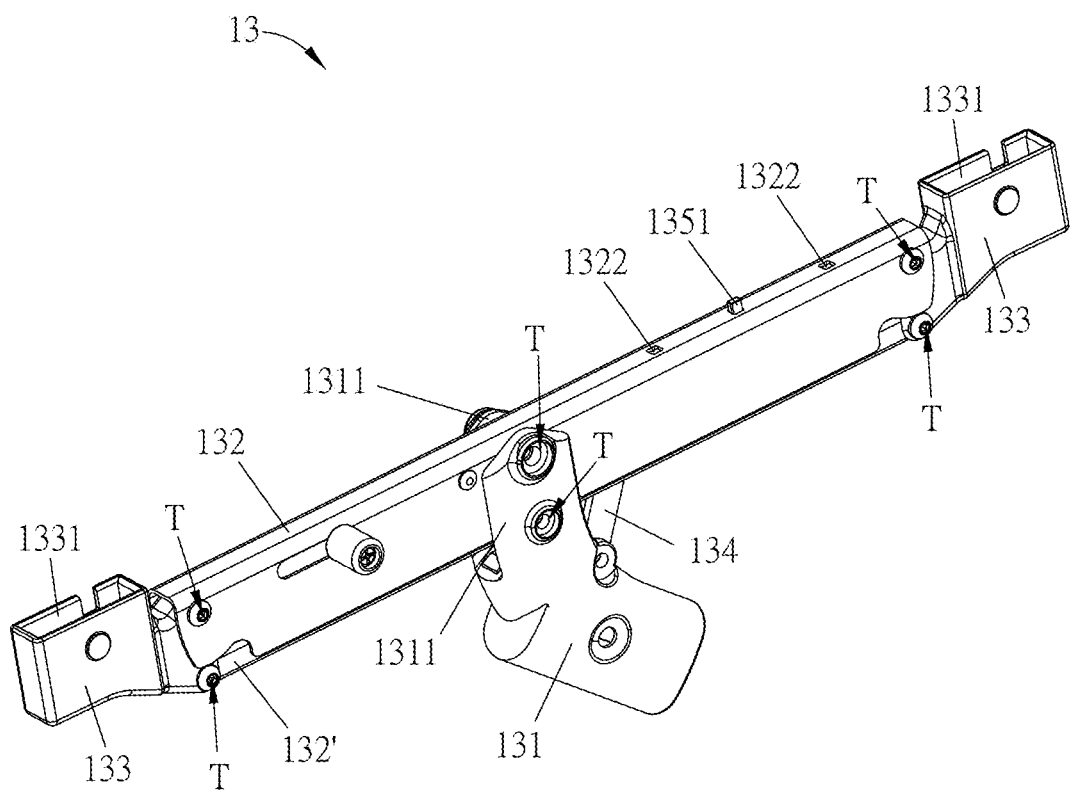
FIG. 3B is a schematic diagram showing the link assembly of the moving carrier of FIG. 2A.

The structure of the link assembly 13 will be described hereinafter with reference to FIGS. 3B and 3C. FIG. 3B is a schematic diagram showing the link assembly 13 of the moving carrier 1 of FIG. 2A, and FIG. 3C is an exploded view of the link assembly 13 of FIG. 3B.

The link assembly 13 is disposed corresponding to the first support member 12. In this embodiment, the link assembly 13 comprises a link member 131, a first connect member 132, a second connect member 132', and two adapter members 133. The link member 131 is disposed at the second end portion E2 of the first support member 12 (see FIG. 2A). The first connect member 132 and the second connect member 132' are disposed on the link member 131 in parallel. In this embodiment, one link assembly 13 and the corresponding first support member 12 are disposed at one side of the moving carrier 1, and another link assembly 13 and the corresponding first support member 12 are disposed at another side of the moving carrier 1. The link member 131 of each link assembly 13 is fixed to the second end portion E2 of the corresponding first support member 12 (see FIG. 2A).

Figure 3C:
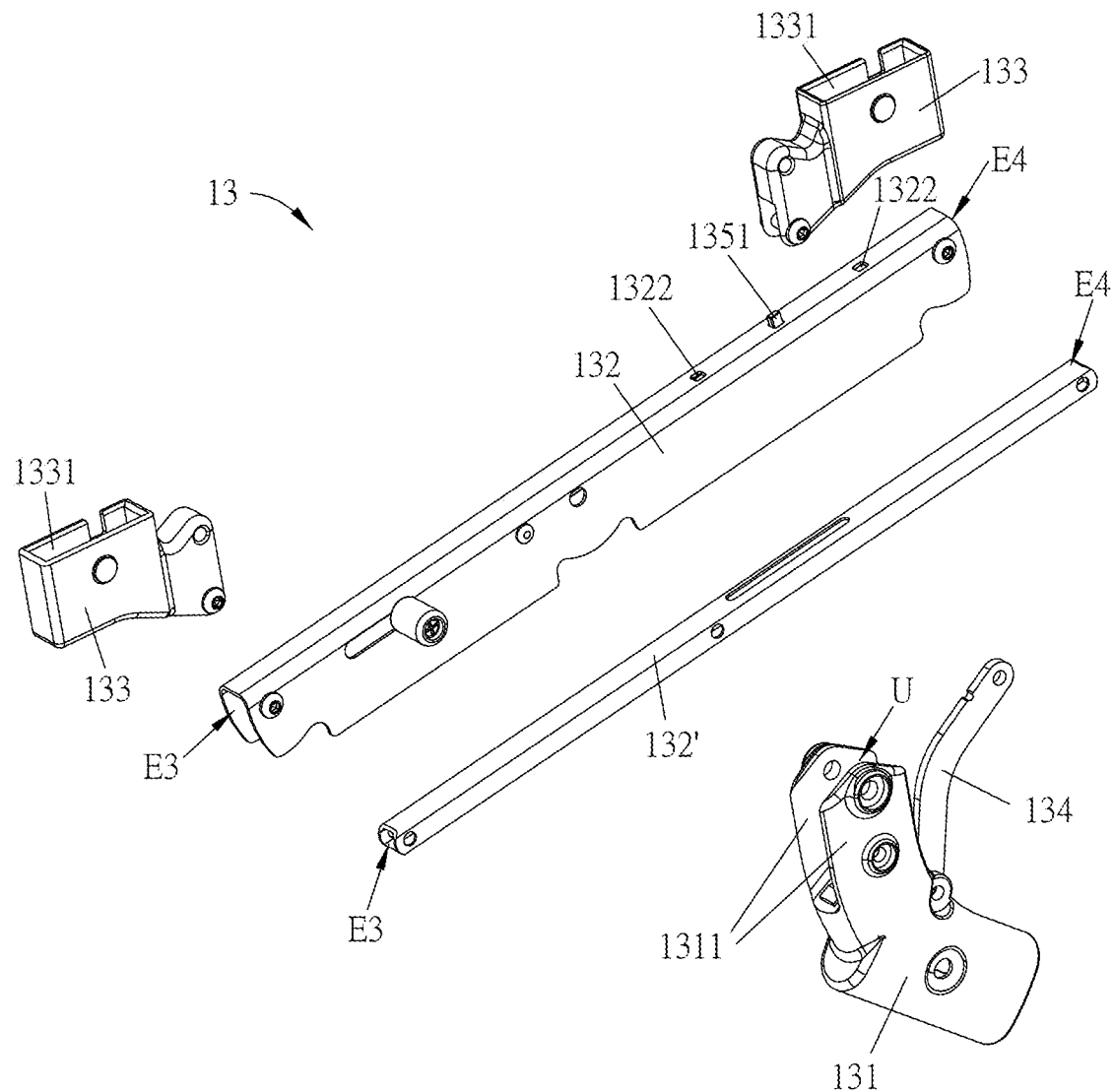
FIG. 3C is an exploded view of the link assembly of FIG. 3B.

As shown in FIGS. 3B and 3C, the link member 131 of this embodiment comprises two protruded link portions 1311, and a recess U is formed between the two link portions 1311. The first connect member 132 and the second connect member 132' are disposed in the recess U and pivotally connected with the link portions 1311, respectively. In this embodiment, the first connect member 132 is pivotally connected with the link portions 1311 through a pivot structure T (see FIG. 3B), and the second connect member 132' is pivotally connected with the link portions 1311 through another pivot structure T. Accordingly, the first connect member 132 and the second connect member 132' can change their positions with relative to the link portions 1311 via the corresponding pivot structures T. Moreover, the cross-section of the first connect member 132 is a reversed U shape, and the second connect member 132' is hidden in the inner side of the reversed U shape, so that the first connect member 132 and the second connect member 132' not only provide the connecting function but also the functions of pretty profile and avoiding clipping.

Figure 4A:
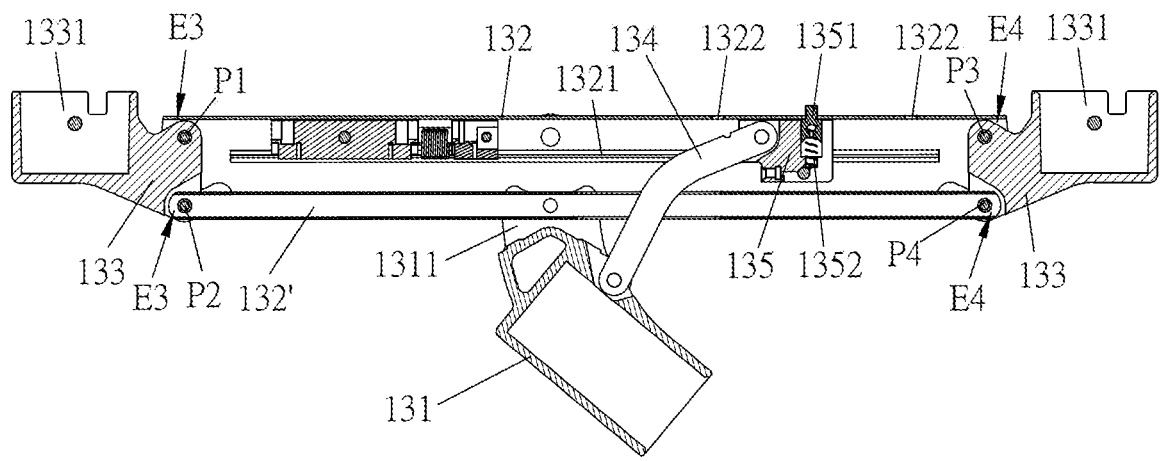
FIGS. 4A and 4B are different sectional views of the link assembly of FIG. 3B.
Figure 4B:
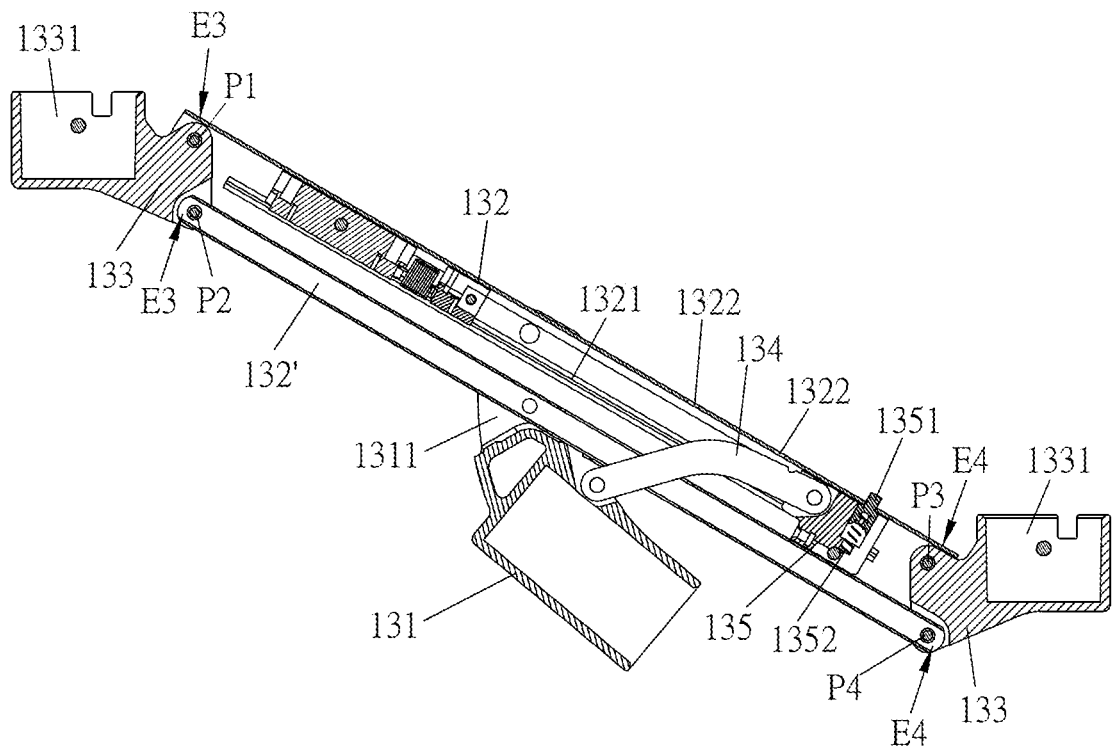
Figure 5A:
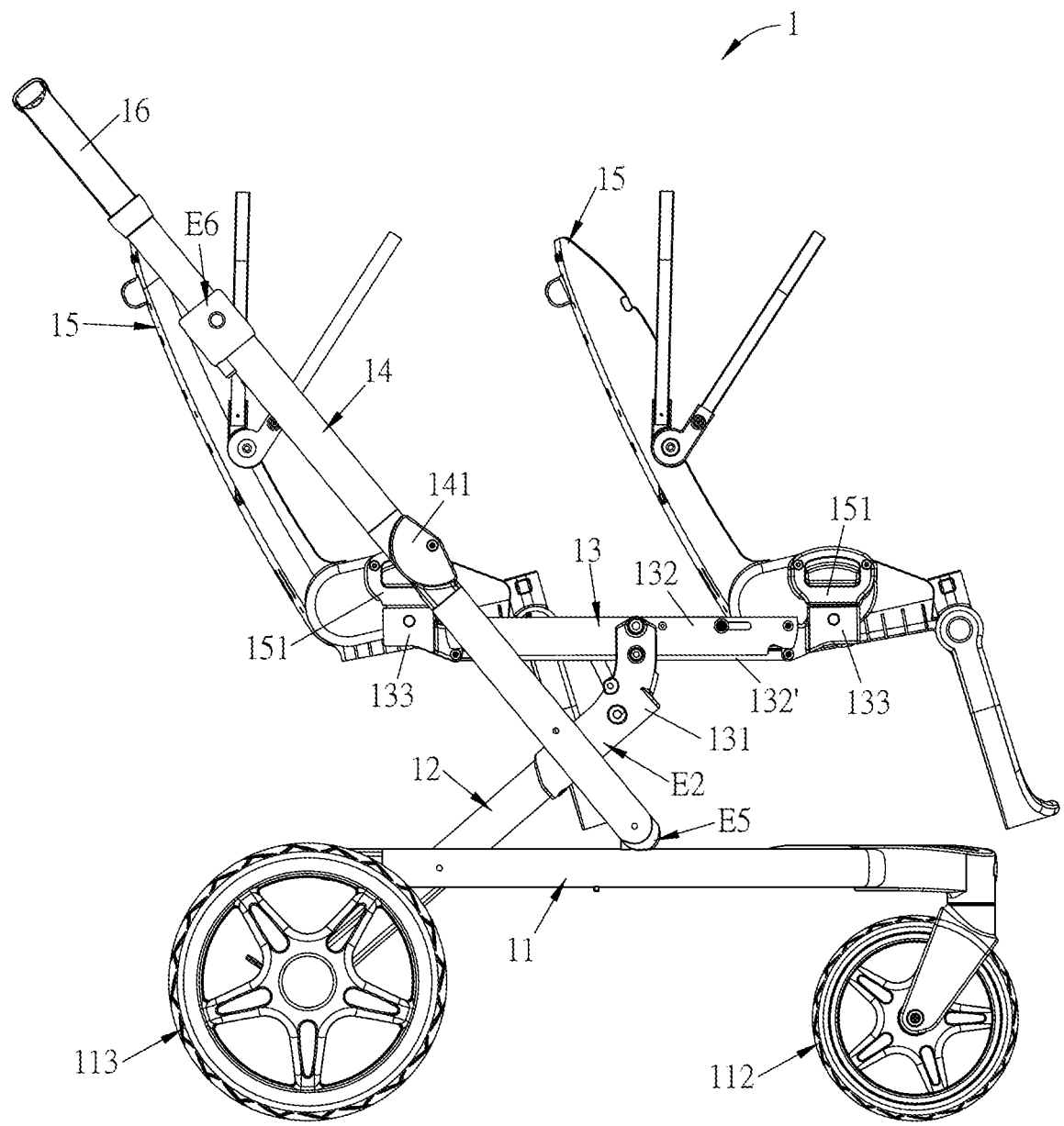
FIGS. 5A and 5B are schematic diagrams of the moving carrier of the embodiment, wherein the carry members are at different positions.
Figure 5B:
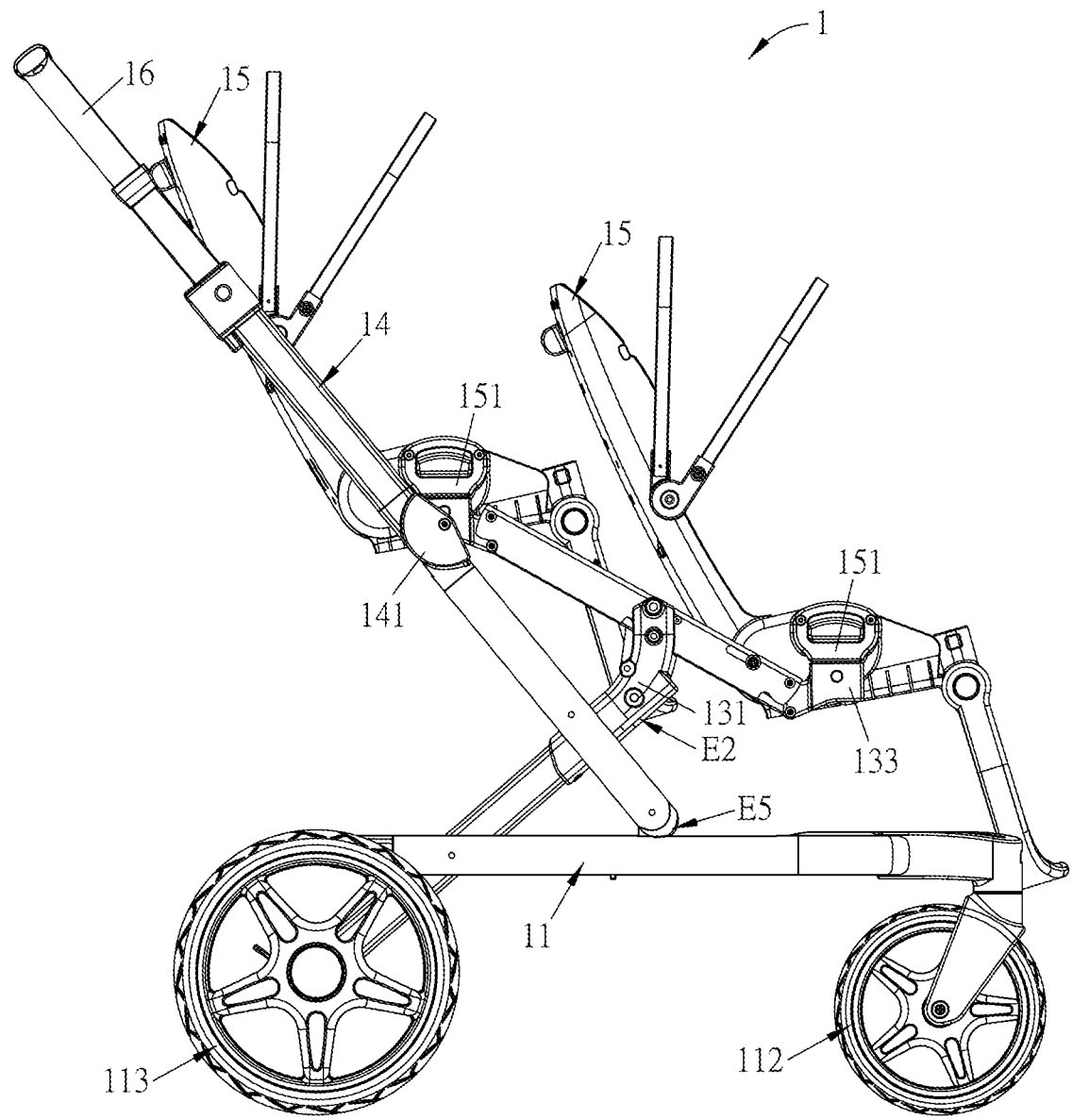
Figure 5C:
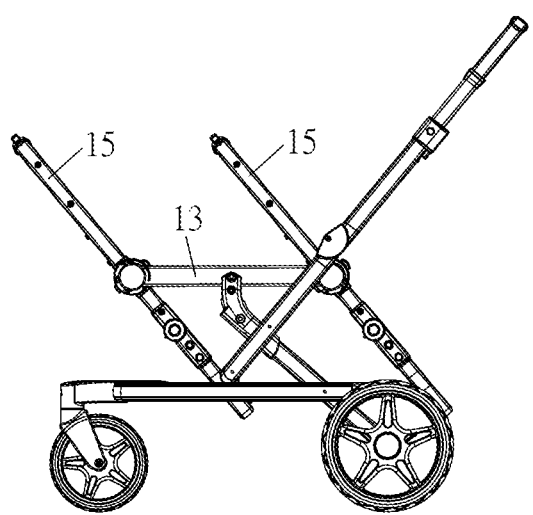
FIGS. 5C to 5N are schematic diagrams showing the link assembly and the carry members of the moving carrier of the embodiment in different relative positions.
Figure 5D:
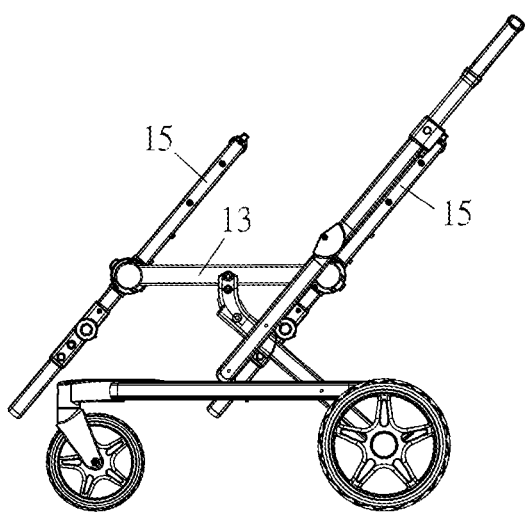
Figure 5E:
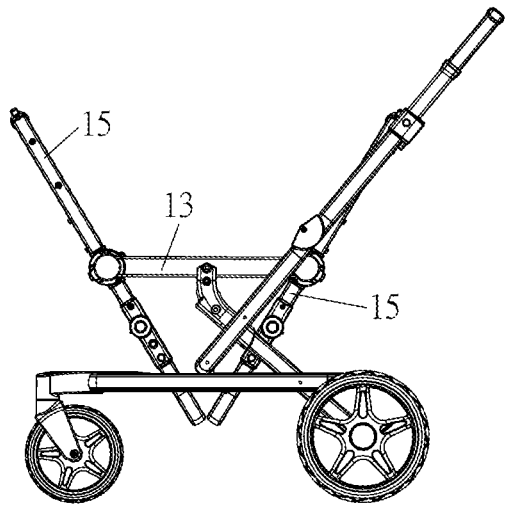
Figure 5F:
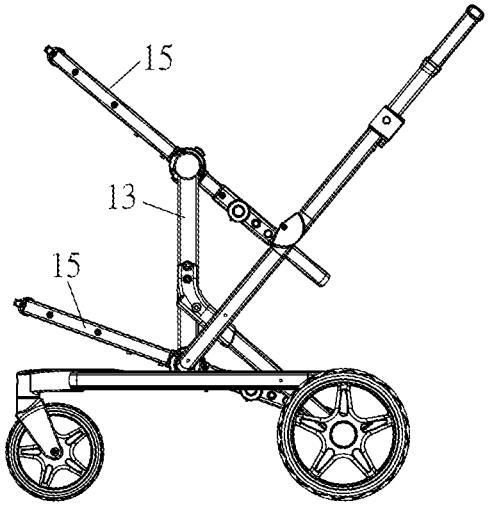
Figure 5G:
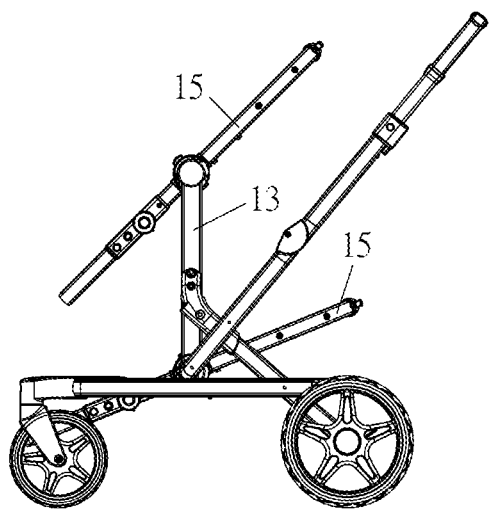
Figure 5H:
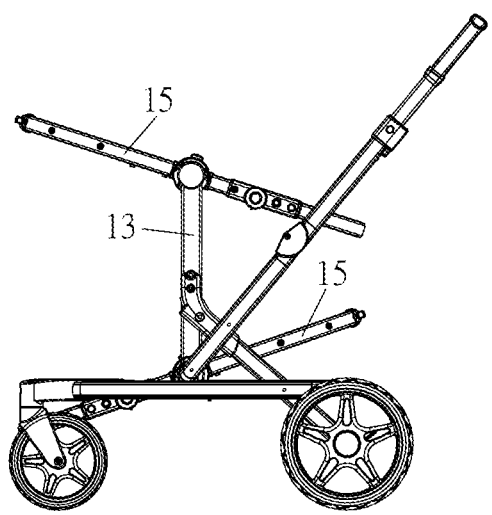
Figure 5I:
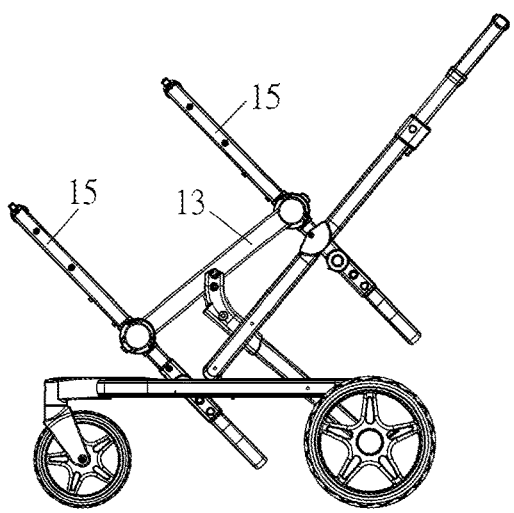
Figure 5J:
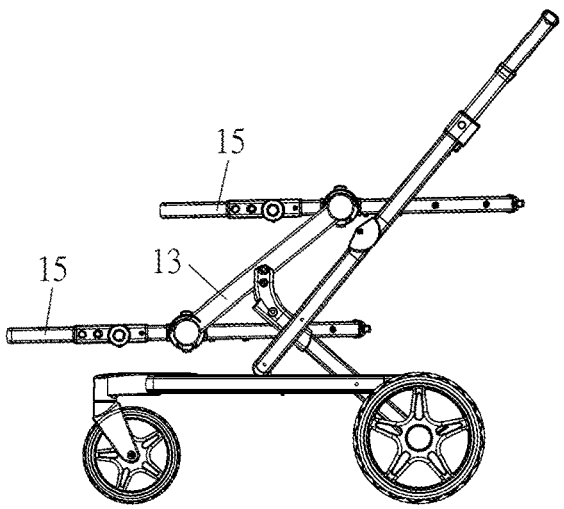
Figure 5K:
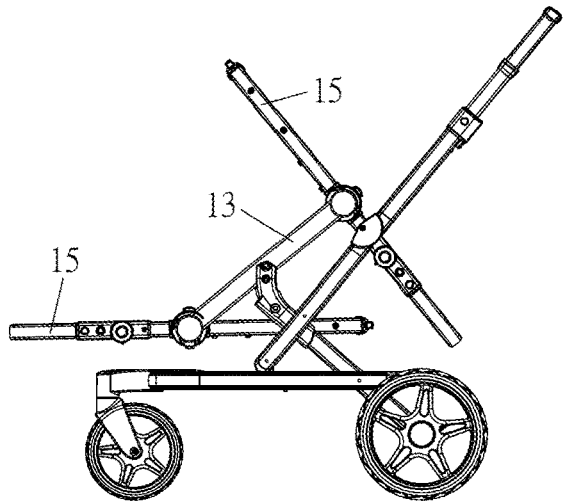
Figure 5L:
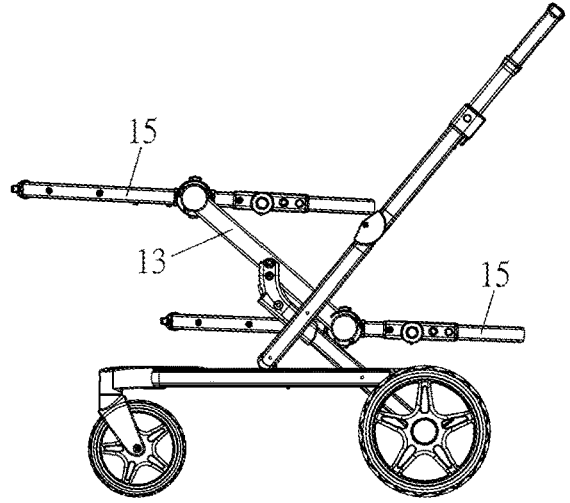
Figure 5M:
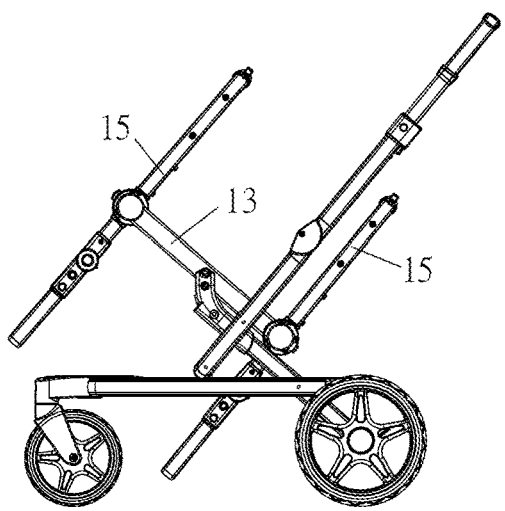
Figure 5N:
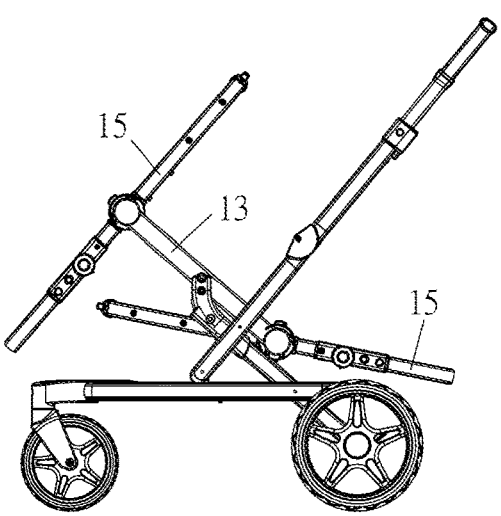

FIGS. 4A and 4B are different sectional views of the link assembly 13 of FIG. 3B, and FIGS. 5A and 5B are schematic diagrams of the moving carrier 1 of the embodiment, wherein the two carry members 15 are at different positions.

Referring to FIGS. 4A and 4B in view of FIGS. 5A and 5B, the link assembly 13 of this embodiment further comprises a third connect member 134. One end of the third connect member 134 connects to the link member 131, and the other end of the third connect member 134 is slidingly disposed on the first connect member 132. Accordingly, in the process of changing the positions of the first connect member 132 and the second connect member 132' with relative to the link member 131, the displacement of the link member 131 and the first connect member 132 (and the second connect member 132') can be limited. In order to allow the other end of the third connect member 134 be slidingly disposed on the first connect member 132, the link assembly 13 of this embodiment further comprises a position member 135, and the first connect member 132 further comprises a sliding track 1321. The position member 135 connects to the other end of the third connect member 134 away from the link member 131, and the third connect member 134 is slidingly disposed on the sliding track 1321 of the first connect member 132 through the position member 135.

In addition, the first connect member 132 of this embodiment further comprises a plurality of position holes 1322, and the position member 135 comprises a position portion 1351 and an elastic member 1352. The position portion 1351 is disposed corresponding to one of the position holes 1322. In this case, there are three position holes 1322 configured on the first connect member 132, and the position portion 1351 is a bump. This disclosure is not limited thereto. In other embodiments, the numbers and aspects of the position portion 1351 and the position holes 1322 can be different. Besides, in this embodiment, the position holes 1322 have equivalent intervals. Of course, in other embodiments, the position holes 1322 may have nonequivalent intervals.

The position portion 1351 is connected with the elastic member 1352, and the position portion 1351 can be inserted into the position hole 1322 via the elastic member 1352. Specifically, when the third connect member 134 slides on the sliding track 1321 of the first connect member 132 via the position member 135, the elastic member 1352 of the position member 135 can push the position portion 1351 so as to insert the position portion 1351 into the position hole 1322 of the first connect member 132, thereby fixing the relative positions of the first connect member 132 (and the second connect member 132') and the link member 131. Accordingly, the position of the link assembly 13 does not change with relative to the first support member 12, and the angle of the link assembly 13 can be fixed. In addition, when the position member 135 slides on the sliding track 1321, the position portion 1351 of the position member 135 can be fixed to one of the three position holes 1322 (stage sliding), but this disclosure is not limited thereto. In other embodiments, the position member 135 can freely slide on the sliding track 1321 in a stage-less sliding. In this case, the position member 135 can slide on the sliding track 1321 to any position, and then the user can use a screw or a locking mechanism to fix the relative positions of the position member 135 and the first connect member 132 (and the second connect member 132'). This disclosure is not limited thereto.

In addition, the first connect member 132 and the second connect member 132' can be pivotally connected to the two link portions 1311, respectively. Two adapter members 133 are disposed corresponding to the ends of the first connect member 132 and the second connect member 132', and each of the adapter members 133 has an adapter portion 1331. Specifically, each of the first connect member 132 and the second connect member 132' has a third end portion E3 and a fourth end portion E4, the third end portion E3 of the first connect member 132 is located corresponding to the third end portion E3 of the second connect member 132', and the fourth end portion E4 of the first connect member 132 is located corresponding to the fourth end portion E4 of the second connect member 132'. One adapter member 133 connects to both of the third end portion E3 of the first connect member 132 and the third end portion E3 of the second connect member 132', and the other adapter member 133 connects to both of the fourth end portion E4 of the first connect member 132 and the fourth end portion E4 of the second connect member 132'. In this embodiment, one adapter member 133 is pivotally connected with the third end portions E3 of the first connect member 132 and the second connect member 132', and the other adapter member 133 is pivotally connected with the fourth end portions E4 of the first connect member 132 and the second connect member 132'. To be noted, in the link assembly 13, when two components are pivotally connected via the pivot structure T, the relative positions of the two components can be changed about the pivot structure T (e.g. relative rotation). The components pivotally connected via the pivot structure T can be referred to FIG. 3B.

In addition, each adapter member 133 comprises an adapter portion 1331, and the carry member 15 has a connect portion 151 disposed at one side of the carry member 15 (see FIG. 5A). Each connect portion 151 is located corresponding to each adapter portion 1331. In this embodiment, the carry member 15 has two sides, and the connect portions 151 disposed at the two sides are located corresponding to the two adapter portions 1331. Herein, the adapter portion 1331 can comprise a recess, a protrusion, an engage member, a lock member, a screw, a screw hole, or any combination thereof, and the connect portion 151 can comprise any structure corresponding to the adapter portion 1331. Accordingly, the adapter portion 1331 and the corresponding connect portion 151 can be firmly connected. In this embodiment, the adapter portion 1331 is a recess, and the connect portion 151 is a protrusion corresponding to the recess, so that the adapter portion 1331 can be tightly connected with the connect portion 151. Moreover, in order to more firmly connect the adapter portion 1331 and the connect portion 151, when the connect portion 151 is inserted into the corresponding adapter portion 1331, the connect portion 151 can be fastened on the adapter member 133 by, for example, screws. This configuration can further firmly connect the two carry members 15 to the two link assemblies 13.

As shown in FIGS. 4A and 4B, the positions of the first connect member 132 and the second connect member 132' can be changed with relative to the link members 131, which means that the positions of the first connect member 132 and the second connect member 132' can be changed with relative to the first support member 12. In this embodiment, in the process of changing the relative positions of the first connect member 132 and the second connect member 132' with relative to the link members 131, the adapter portions 1331 of the link assemblies 13 are oriented to the same direction. In other words, regarding the link assembly 13 of FIGS. 4A and 4B, in the process of rotating the first connect member 132 and the second connect member 132' in clockwise with relative to the link member 131 (from the position of FIG. 4A to the position of FIG. 4B), the two adapter portions 1331 (recesses) are oriented to the same direction (e.g. upward direction). Of course, in the process of rotating the first connect member 132 and the second connect member 132' in counterclockwise with relative to the link member 131, the two adapter portions 1331 (recesses) are also oriented to the same direction (e.g. upward direction). In this embodiment, the first connect member 132, the second connect member 132' and the two adapter members 133 are connected to form a parallelogram structure, which has four joints P1~P4 (pivot points). When the positions of the first connect member 132 and the second connect member 132' are changed with relative to the link member 131 (rotation), the four joints P1~P4 of the parallelogram structure can limit the movements of the first connect member 132 and the second connect member 132', so that the first connect member 132 and the second connect member 132' always remain in parallel during the rotation process, and the two adapter portions 1331 are oriented to the same direction.

The positions of the link assemblies 13 as shown in FIGS. 5A and 5B are corresponding to FIGS. 4A and 4B. As shown in FIGS. 5A and 5B, in the process of rotating the link assemblies 13, since the adapter portions 1331 are oriented to the same direction (upward direction), the two carry members 15 can be maintained in the same upward direction, so that the passengers can still sit on the carry members 15. FIG. 5A shows that the two carry members 15 are located on the same horizontal plane, and FIG. 5B shows that the rear carry member 15 is higher than the front carry member 15. To be noted, the link assemblies 13 can be rotated in clockwise from the position of FIG. 5A to the position of FIG. 5B. Of course, the link assemblies 13 can also be rotated in counterclockwise to make the front carry member 15 higher than the rear carry member 15, and this disclosure is not limited. Accordingly, the moving carrier 1 of this embodiment has two carry members 15, which are position changeable, so that the relative positions of the two carry members 15 can be changed according to the requirements of the user. To be noted, when the user changes the positions of the two carry members 15 of the moving carrier 1, the relative positions of the first connect member 132 and the second connect member 132' with relative to the link member 131 can be fixed by inserting the position portion 1351 to the position hole 1322. Accordingly, the relative positions of the two carry members 15 can be fixed. This configuration can prevent the risk of passenger falling caused by the unstable carry members 15 during the moving period of the moving carrier 1.

In some applications, the relative positions of the link assemblies and the carry members of the moving carrier can be changed. For example, as shown in FIGS. 5C to 5N (in the side view), the link assemblies 13 can be in vertical or tilt with relative to the ground, and the two carry members 15 can also be rotated to the vertical or tilt status. Therefore, the positions of the link assemblies 13 and the carry members 15 can have various combinations for satisfying various requirements of different users.

Figure 6A:
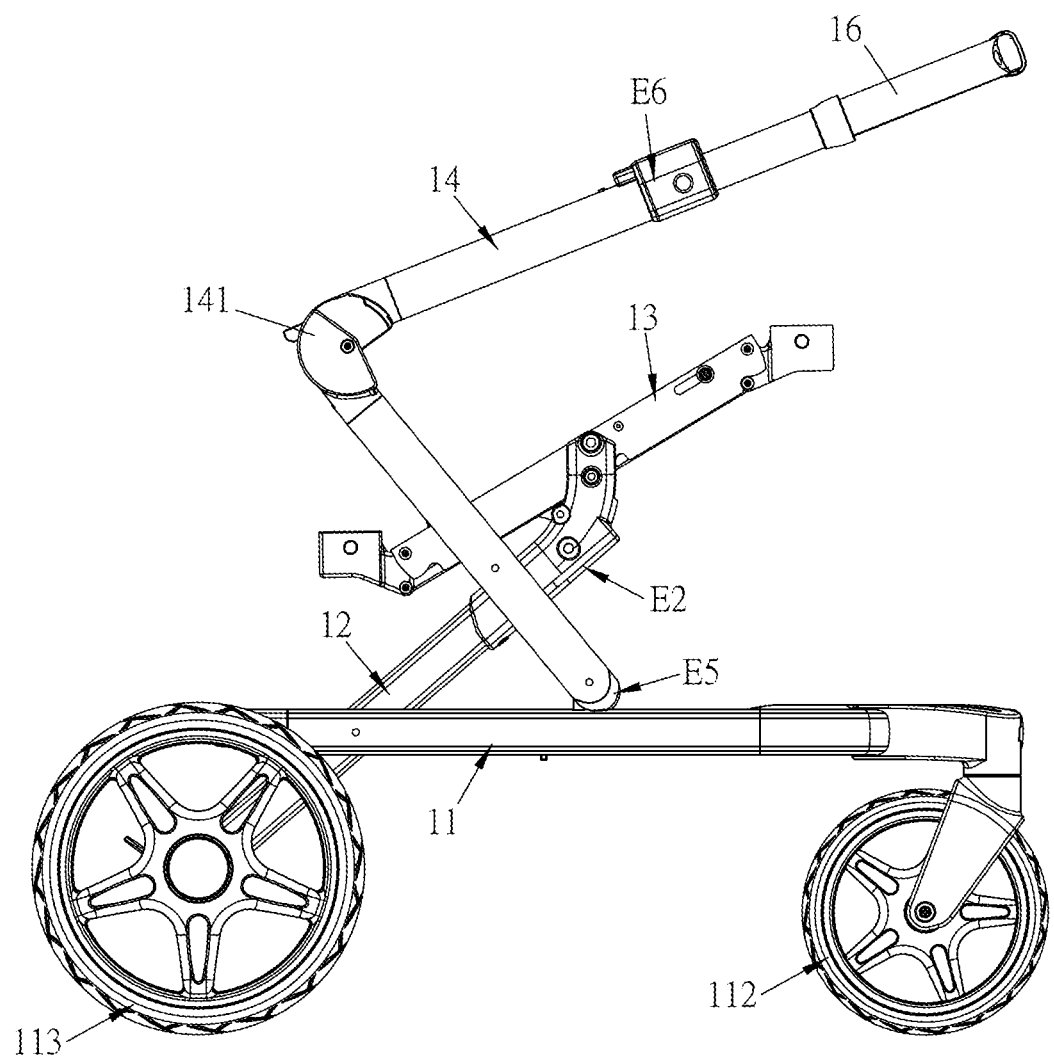
FIGS. 6A to 6C are schematic diagrams showing the folding procedure of the moving carrier of FIG. 5A.
Figure 6B:
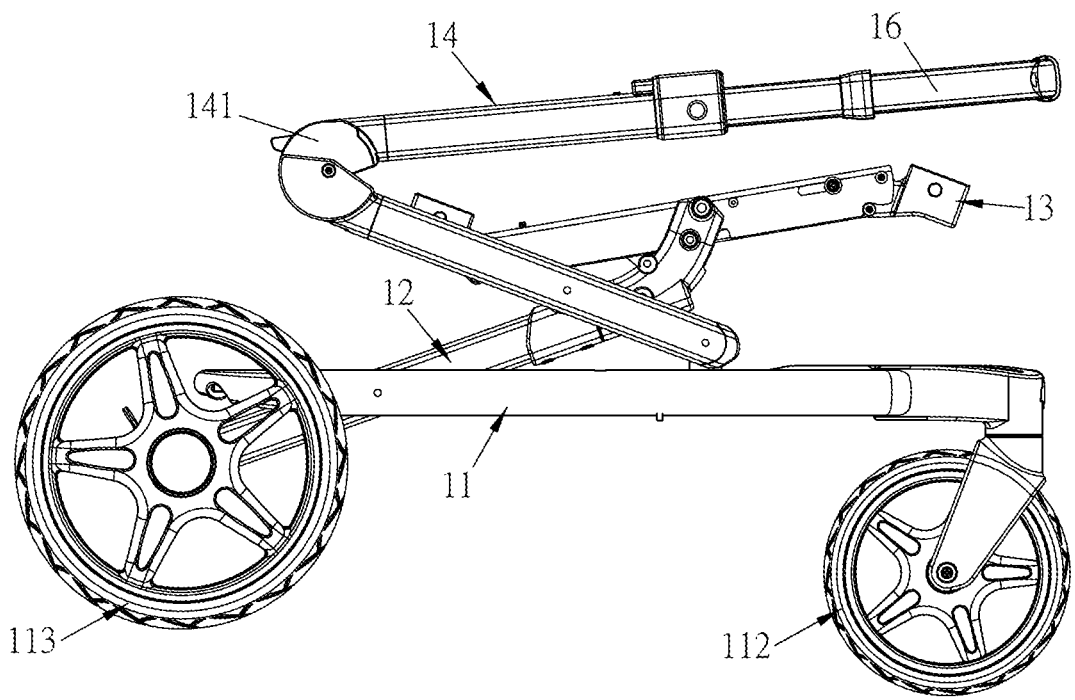
Figure 6C:
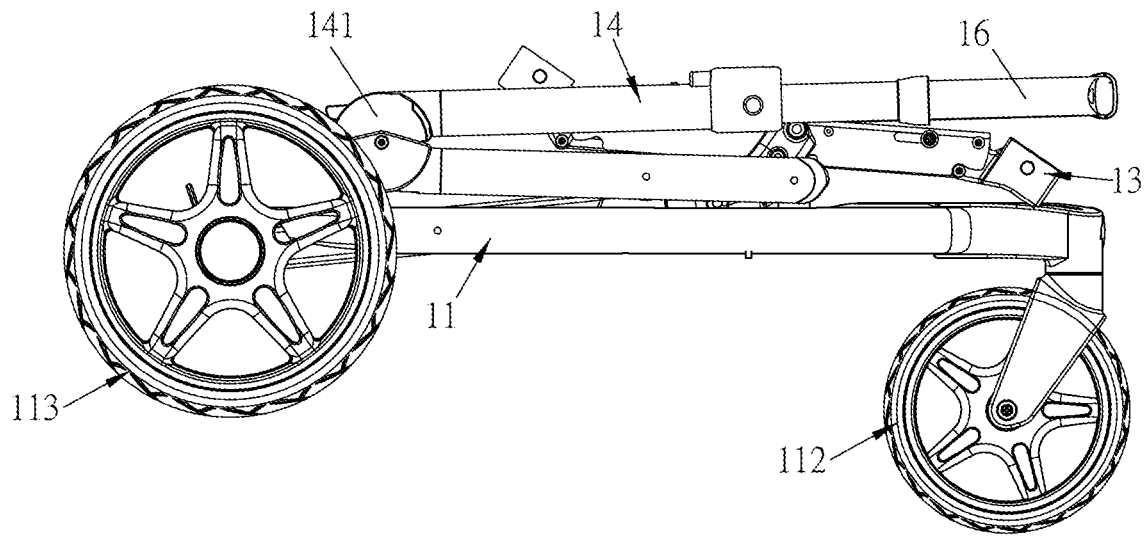

FIGS. 6A to 6C are schematic diagrams showing the folding procedure of the moving carrier 1 of FIG. 5A. To be noted, the carry members 15 are not shown in the moving carrier 1 of FIGS. 6A to 6C. In addition, the structure of the moving carrier 1 has been described in the above embodiment, so the details thereof will be omitted.

The folding method of the moving carrier 1 of this embodiment comprises the following steps.

In the step 1, the two carry members 15 are separated from the link assemblies 13, so that the moving carrier 1 does not contain the carry members 15.

In the step 2, as shown in FIG. 6A, the second support member 14 is folded about a folding pivot portion 141 of the second support member 14 toward the bottom frame assembly 11. Thus, the second support member 14 can be pushed toward the bottom frame assembly 11.

In the step 3, the folded second support member 14 (including the handlebar frame 16) is continuously pushed toward the bottom frame assembly 11 until the second support member 14 is parallel to the bottom frame assembly 11 (see FIG. 6C). In the folding process, the adapter portions 133 are oriented to the same direction, and the first connect member 132 and the second connect member 132' remain in parallel to each other. In addition, when the second support member 14 is pushed toward the bottom frame assembly 11, the first support member 12 and the link assembly 13 can be carried to move downwardly, so that the first support member 12 and the link assembly 13 are all moved toward the bottom frame assembly 11. The folded moving carrier 1 has a smaller occupied space, and it is convenient for storage and carrying the moving carrier 1.

Figure 7A:
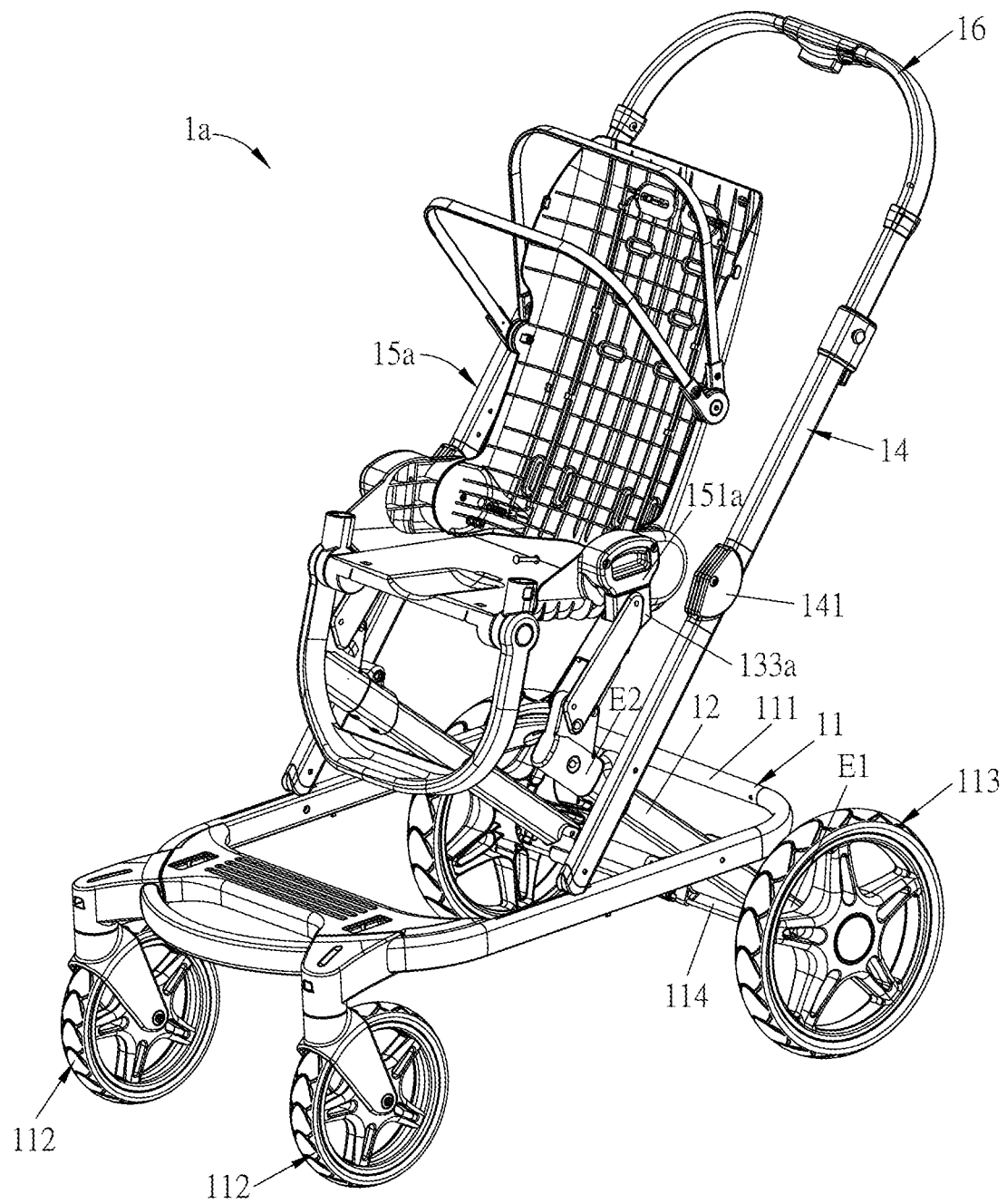
FIGS. 7A, 7B and 8 are schematic diagrams showing the moving carriers according to different embodiments of this disclosure.
Figure 7B:
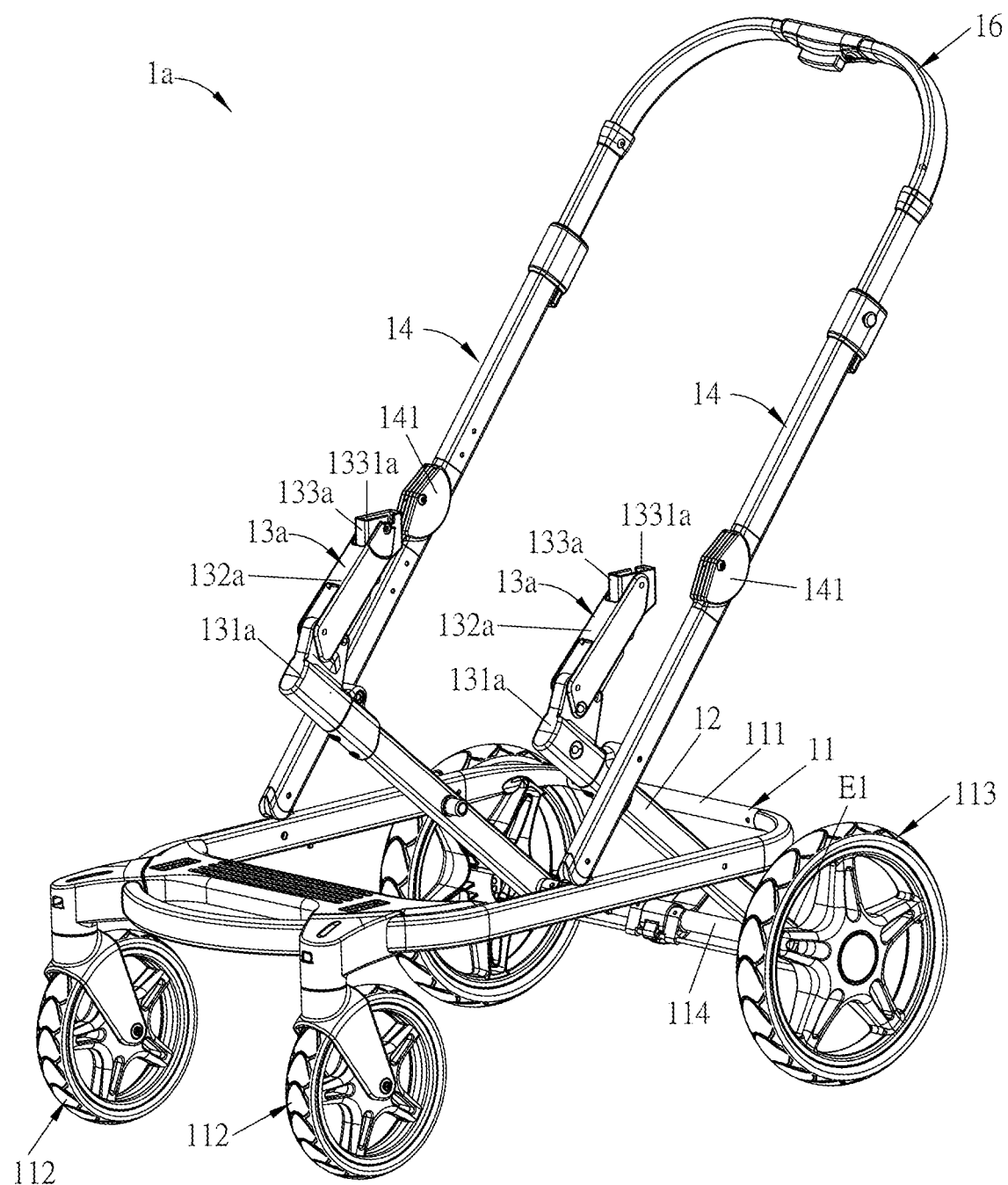

FIGS. 7A, 7B and 8 are schematic diagrams showing the moving carriers 1a and 1b according to different embodiments of this disclosure. FIG. 7A shows the moving carrier 1a, and FIG. 7B shows the moving carrier 1a of FIG. 7A without the carry members 15a.

As shown in FIGS. 7A and 7B, the moving carrier 1a of this embodiment is mostly the same as the moving carrier 1 of the previous embodiment, but the link assembly 13a of the moving carrier 1a is different from the link assembly 13 of the moving carrier 1. In this embodiment, each link assembly 13a comprises a link member 131a, a connect member 132a and an adapter member 133a. The link member 131a is disposed at the second end portion E2 of the first support member 12 (see FIG. 7A). The connect member 132a is disposed on the link member 131a, and connected to the second end portion E2 of the first support member 12 through the link member 131a. In addition, the moving carrier 1a of this embodiment comprises, for example, one carry member 15a (seat). As shown in FIGS. 7A and 7B, each of the adapter members 133a disposed at two sides of the carry member 15a comprises an adapter portion 1331a, and the carry member 15a comprises connect portions 151a disposed at two sides of the carry member 15a (see FIG. 7A). The connect portions 151a are disposed corresponding to the adapter portion 1331a, respectively.

As shown in FIG. 8, the moving carrier 1b of this embodiment is mostly the same as the moving carrier 1 of the previous embodiment. Different from the moving carrier 1, each of the link assemblies 13b of the moving carrier 1b of this embodiment comprises one link member 131b only. In addition, the moving carrier 1b of this embodiment comprises, for example, one carry member 15b, such as a storage basket. In this case, the moving carrier 1b can be used as a pet stroller. The carry member 15b comprises two link assemblies 13b disposed at two sides of the carry member 15b, and each of the link assemblies 13b is connected with the second end portion E2 of each first support member 12 through the corresponding link member 131b (and/or screws).

As mentioned above, it is very simple to change the carry mode of the moving carriers 1, 1a and 1b. For example, the proper link assembly or link assemblies can be installed so as to substitute the two seats by a single seat, or to change another type of carry member. Accordingly, the moving carrier of the disclosure also has the characteristics of easily changing the carrying mode and having various carrying modes.

Figure 9A:
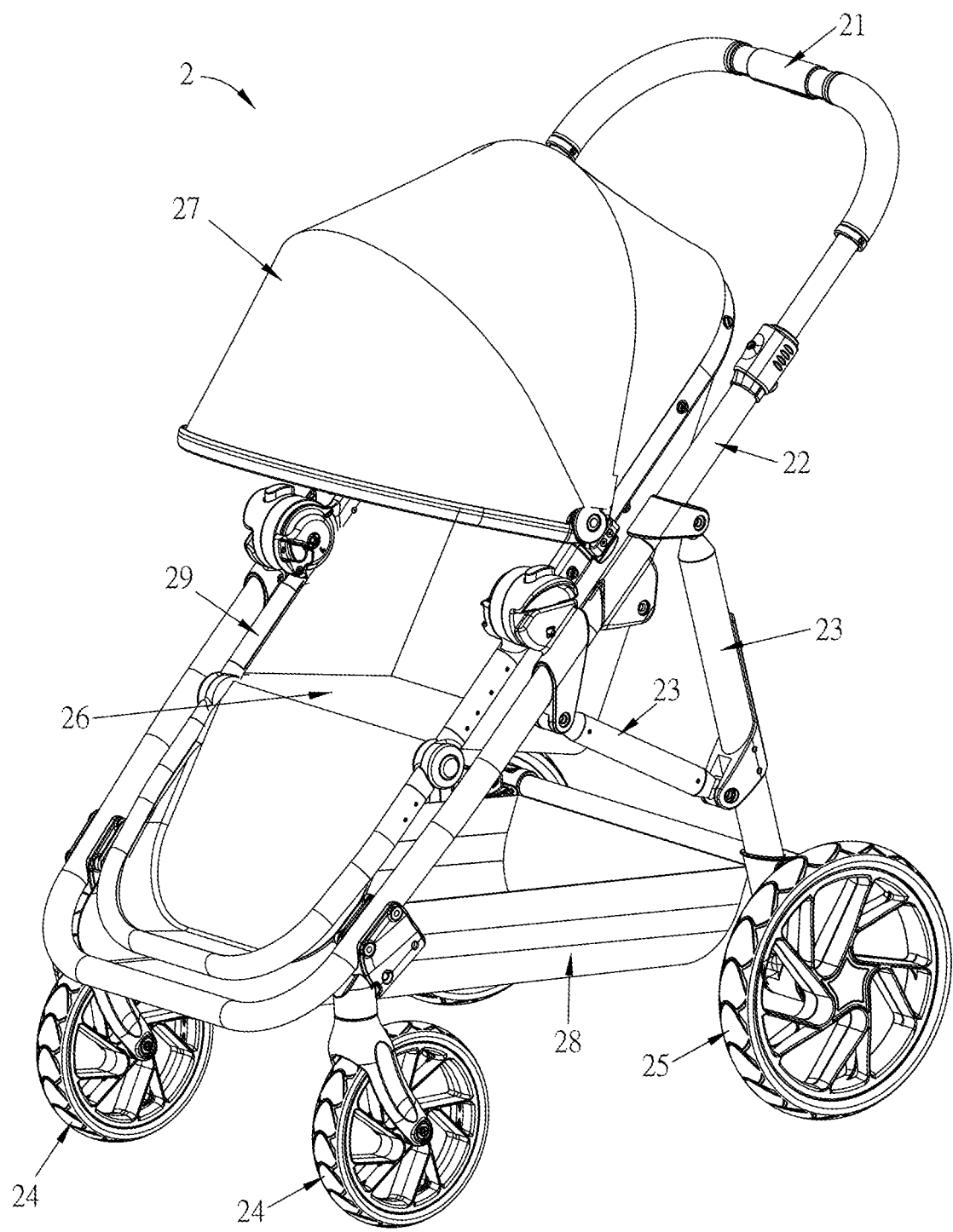
FIG. 9A is a schematic diagram showing a moving carrier according to another embodiment of this disclosure.
Figure 9B:
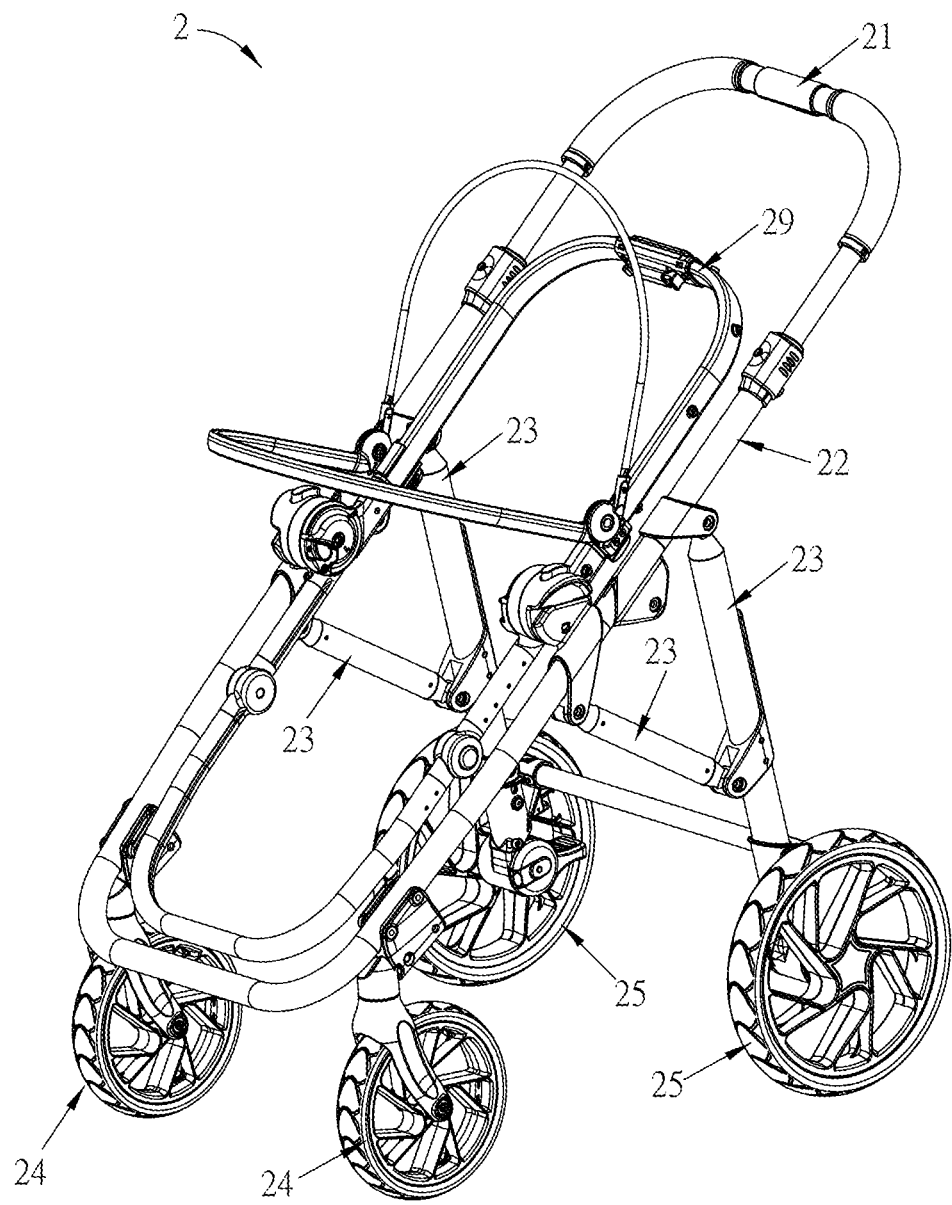
FIG. 9B is a schematic diagram showing the moving carrier of FIG. 9A, wherein the carry member, the top canopy and the storage member are removed.

FIG. 9A is a schematic diagram showing a moving carrier 2 according to another embodiment of this disclosure. In this embodiment, the moving carrier 2 is, for example, a single-seat stroller, which comprises one handlebar frame 21, two support frames 22, two bottom frames 23, two front wheel assemblies 24, two rear wheel assemblies 25, one carry member 26, one top canopy 27, one storage member 28, and one seat frame 29. The support frames 22 and the bottom frames 23 together form a bracket. The support frames 22 are connected with the bottom frames 23. Two ends of the handlebar frame 21 are connected with the two support frames 22, respectively. The seat frame 29 is installed on the bracket (the support frames 22 and the bottom frames 23), and the top canopy 27 and the carry member 26 are installed on the seat frame 29. In this embodiment, the carry member 26, the top canopy 27 and the storage member 28 are detachable with relative to the bottom frame 23. FIG. 9B is a schematic diagram showing the moving carrier 2 of FIG. 9A, wherein the carry member 26, the top canopy 27 and the storage member 28 are removed.

In some embodiments, the moving carrier 2 can be converted into a baby trailer, which can be connected behind, for example, a bicycle through a tow bar. Two embodiments of converting the moving carrier 2 into the baby trailer will be described hereinafter.

Figure 10A:
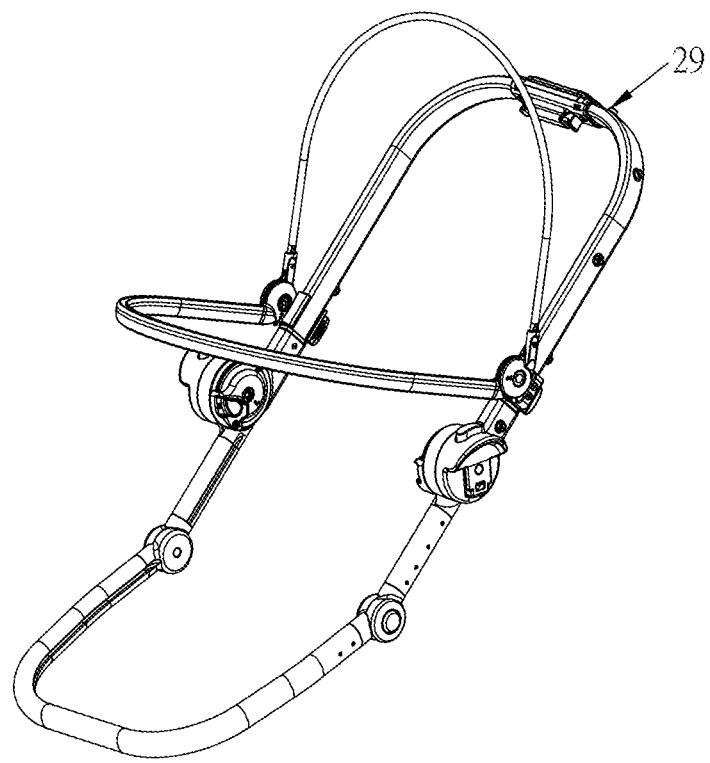
FIGS. 10A to 10E are schematic diagrams showing a first embodiment of converting the moving carrier of this disclosure to a baby trailer.
Figure 10B:
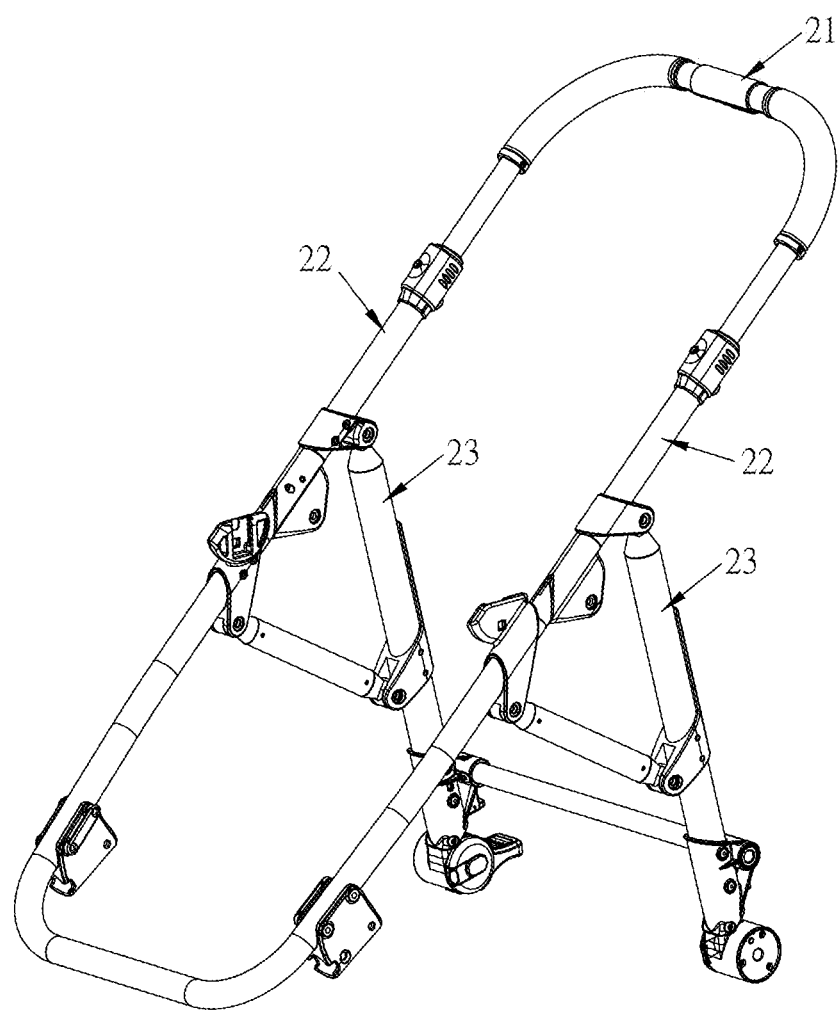
Figure 10C:
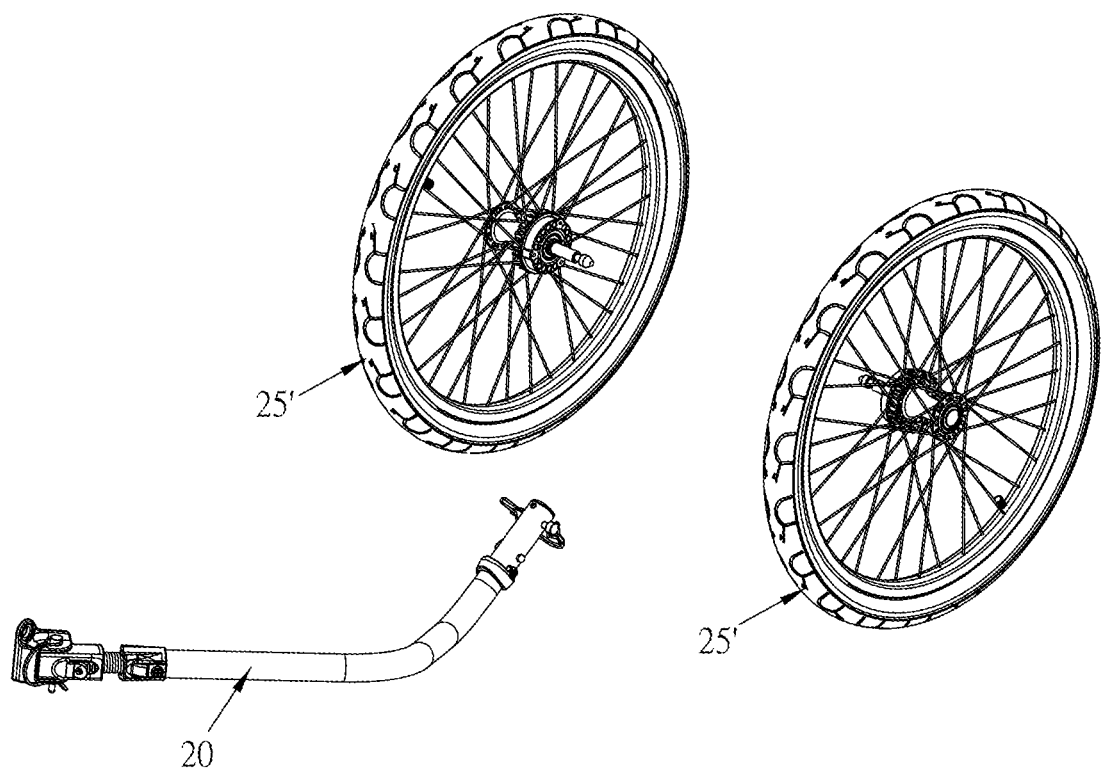
Figure 10D:
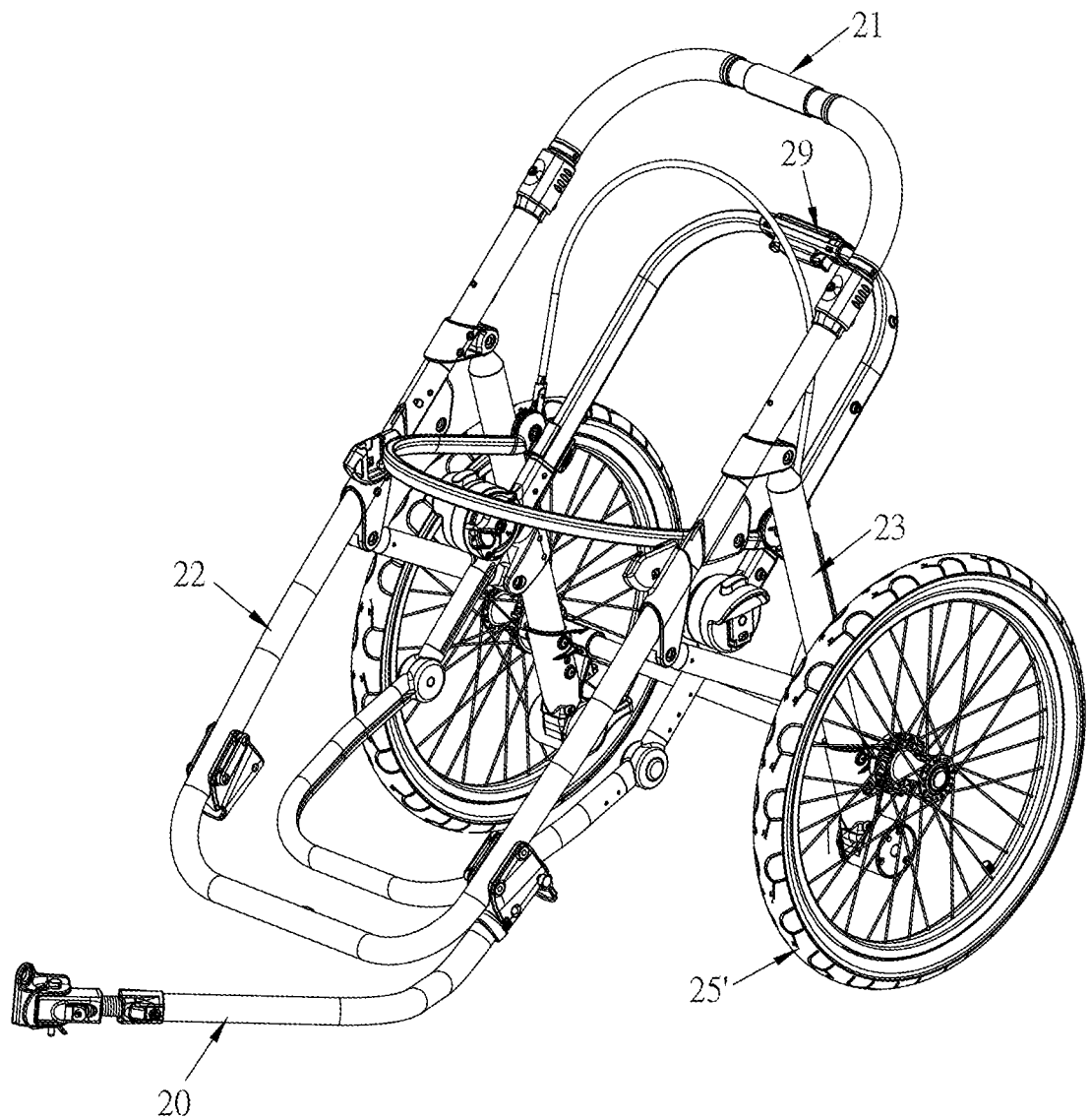
Figure 10E:
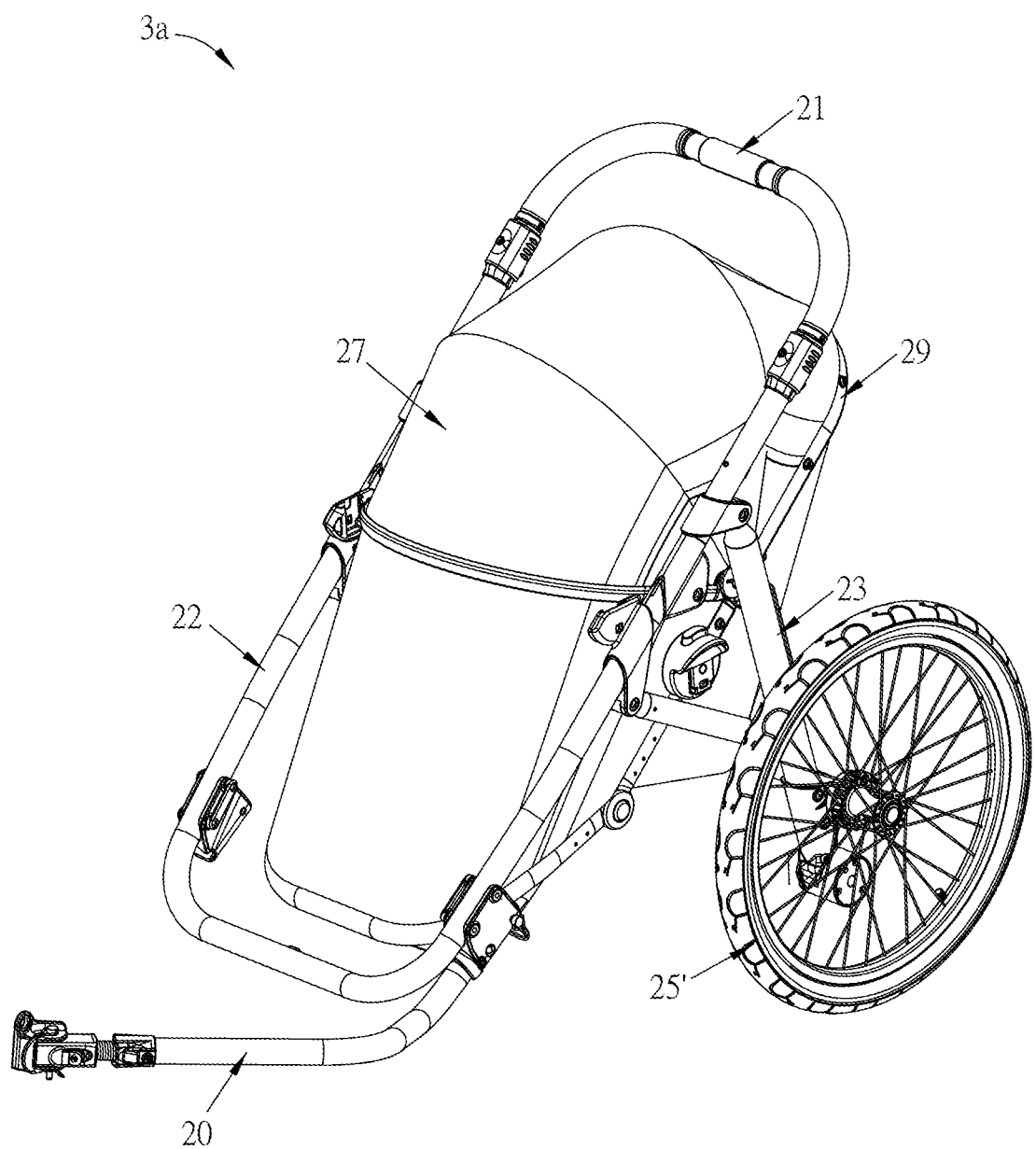
Figure 11A:
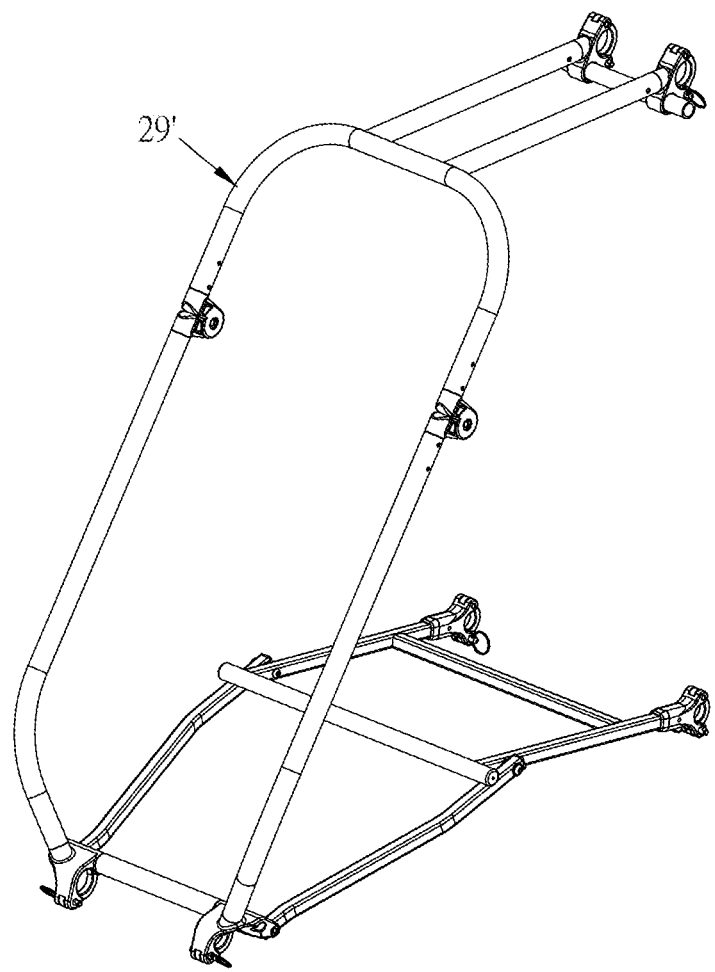
FIGS. 11A to 11C are schematic diagrams showing a second embodiment of converting the moving carrier of this disclosure to a baby trailer.
Figure 11B:
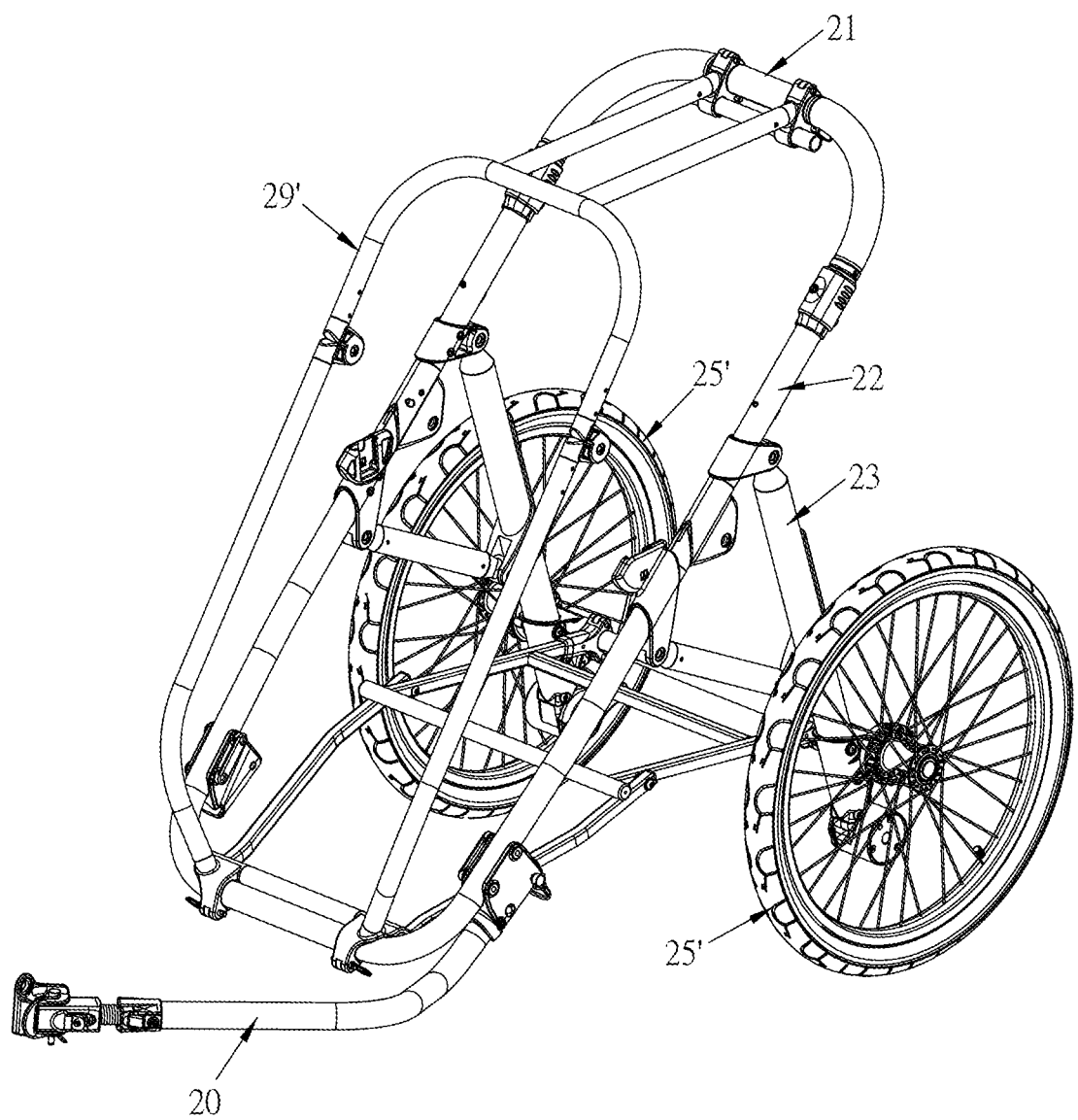
Figure 11C:
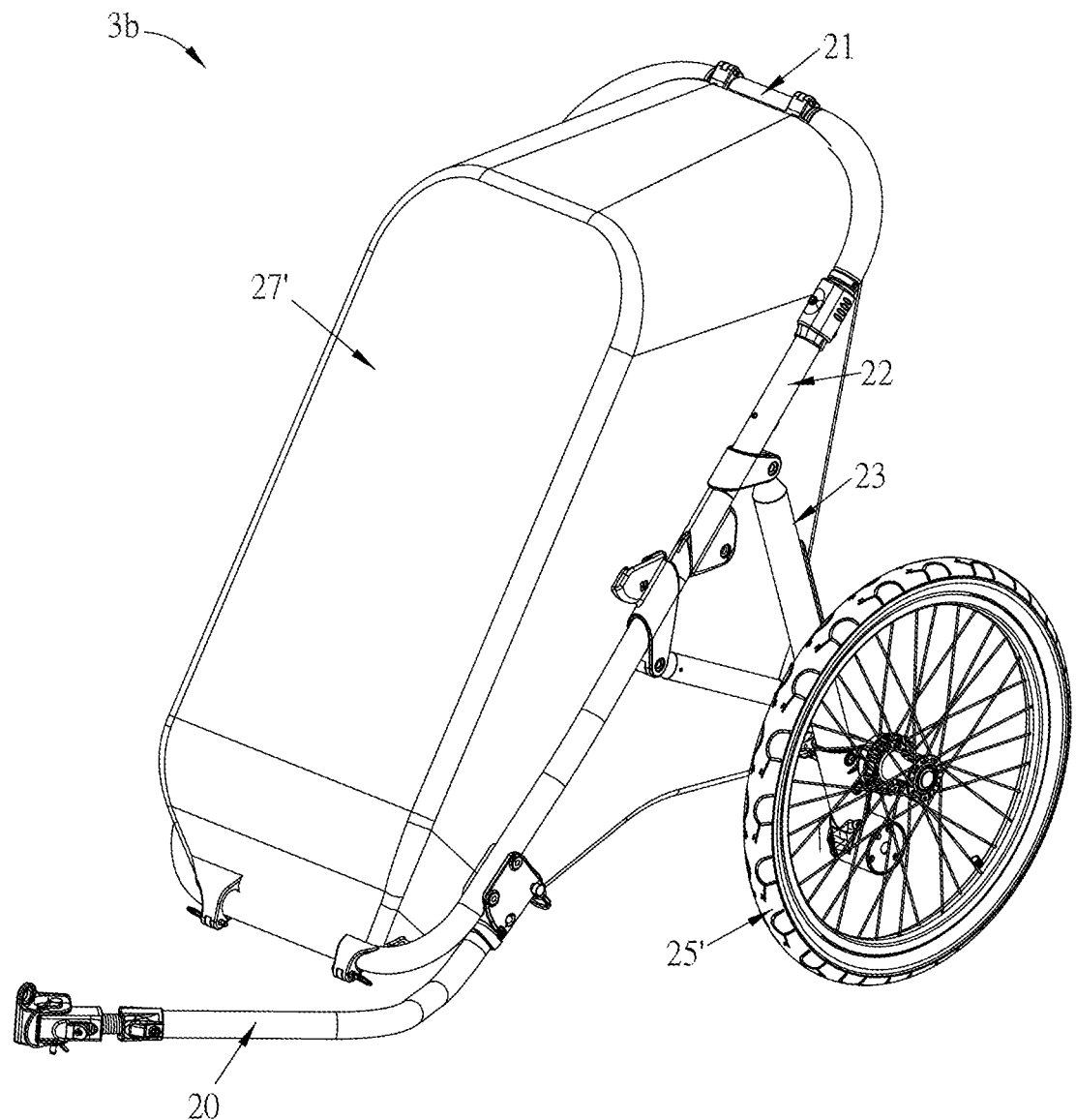

FIGS. 10A to 10E are schematic diagrams showing a first embodiment of converting the moving carrier of this disclosure to a baby trailer, and FIGS. 11A to 11C are schematic diagrams showing a second embodiment of converting the moving carrier of this disclosure to a baby trailer. FIGS. 10A to 10C show the components of the baby trailer 3a of the first embodiment, and FIGS. 10D to 10E show the assembled baby trailer 3a of the first embodiment. FIG. 11A shows the components of the baby trailer 3b of the second embodiment, and FIGS. 11B to 11C show the assembled baby trailer 3b of the second embodiment.

As shown in FIGS. 10A to 10E, this embodiment remains the seat frame 29 (FIG. 10A), the bracket (the support frame 22 and the bottom frame 23, FIG. 10B), the handlebar frame 21 (FIG. 10B) and the top canopy 27 (FIG. 10E) of the moving carrier 2. Firstly, the front wheel assemblies 24 and the rear wheel assemblies 25 of the moving carrier 2 are removed from the moving carrier 2. Then, the larger-sized rear wheel assemblies 25' (FIGS. 10C and 10D) are installed, and a tow bar 20 (FIG. 10C) is attached to one side of the support frame 22 (FIGS. 10D and 10E). Finally, the carry member 26 and the top canopy 27 are installed to form the baby trailer 3a of the first embodiment (FIG. 10E). In this case, the connection position of the seat frame 29 and the bracket (the support frame 22 and the bottom frame 23) is adjustable. In the baby trailer 3a, the connection position of the seat frame 29 and the bracket (the support frame 22 and the bottom frame 23) is different from the baby stroller mode. Herein, the seat frame 29 of the baby trailer 3a is connected to a lower position of the support frame 22 and the bottom frame 23, thereby lowering the gravity center of the baby trailer 3a. The configuration of the large-sized rear wheel assemblies 25' and the lower gravity center design allows the baby trailer 3a to travel safer and is less likely to be overturned. Furthermore, as shown in FIG. 10E, the top canopy 27 can be pulled down to cover the entire carry member 26 so as to block rain, wind, or dust. Moreover, in some embodiments, the top canopy 27 can be provided with a transparent film, a gauze, a zipper, an opening, or any of other suitable accessories to allow the babysitter to view the conditions of the infant or baby in the seat.

In addition, as shown in FIGS. 10B and 10C in view of FIGS. 11A to 11C, the second embodiment is to remove the seat frame 29, the front wheel assemblies 24 and the rear wheel assemblies 25 of the moving carrier 2 are removed from the moving carrier 2. Then, another seat frame 29' (FIG. 11A) is installed on the original bracket (the support frame 22 and the bottom frame 23) of the moving carrier 2. Afterward, the larger-sized rear wheel assemblies 25' are installed, and a tow bar 20 (FIG. 11B) is attached to one side of the support frame 22 (FIG. 11B). Finally, the corresponding carry member is installed on the seat frame 29' (corresponding to a new front cover 27', FIG. 11C) to form the baby trailer 3b of the second embodiment. In addition, as shown in FIG. 11C, the front cover 27' can be pulled down to cover the entire seat frame 29' and the carry member so as to block rain, wind, or dust. Moreover, the front cover 27' can be provided with a transparent film, a gauze, a zipper, an opening, or any of other suitable accessories to allow the babysitter to view the conditions of the infant or baby in the seat.

To sum up, in the moving carrier of this disclosure, the link member of the link assembly is disposed at the second end portion of the first support member, the first connect member and the second connect member are disposed on the link member and connected to the second end portion of the first support member through the link member, the adapter members are disposed corresponding to the ends of the first connect member and the second connect member, and each of the adapter members has an adapter portion. In the process of changing positions of the first connect member and the second connect member relative to the link member, the adapter portions are oriented to the same direction. This structural design makes it possible to change the relative positions of two carry members of the moving carrier based on the requirement of the user, thereby satisfying various requirements of the user. In addition, the folding method of the moving carrier of this disclosure can make the moving carrier become smaller (smaller occupied space), which can facilitate the storage and carrying of the moving carrier.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A moving carrier, comprising:
   a bottom frame assembly;
   a first support member having a first end portion and a second end portion, wherein the first end portion is connected with the bottom frame assembly; and
   at least one link assembly comprising a link member, a first connect member, a second connect member, and two adapter members, wherein the link member is disposed at the second end portion of the first support member, the first connect member and the second connect member are disposed on the link member and connected to the second end portion of the first support member through the link member, the adapter members are disposed corresponding to ends of the first connect member and the second connect member, and each of the adapter members has an adapter portion;
   wherein, in the process of changing positions of the first connect member and the second connect member relative to the link member, the distance between each of the adaptor portions and the bottom frame assembly is changed and the adapter portions are oriented to the same direction.

2. The moving carrier according to claim 1, wherein the moving carrier comprises two of the link assemblies disposed at two sides of the moving carrier.

3. The moving carrier according to claim 1, wherein in the process of changing the positions of the first connect member and the second connect member relative to the link member, the first connect member and the second connect member maintain in parallel.

4. The moving carrier according to claim 1, wherein each of the first connect member and the second connect member comprises a third end portion and a fourth end portion, the third end portion of the first connect member is located corresponding to the third end portion of the second connect member, the fourth end portion of the first connect member is located corresponding to the fourth end portion of the second connect member, one of the two adapter portions connects to both of the third end portion of the first connect member and the third end portion of the second connect member, and the other one of the two adapter portions connects to both of the fourth end portion of the first connect member and the fourth end portion of the second connect member.

5. The moving carrier according to claim 1, wherein the link member comprises a link portion, and the first connect member and the second connect member are pivotally connected to the link portion.

6. The moving carrier according to claim 1, further comprising:
at least one carry member, wherein the carry member has a connect portion disposed at one side of the carry member and disposed corresponding to the adapter portion.

7. The moving carrier according to claim 6, wherein the carry member is a seat, a shelf, a carrycot, or a storage basket.

8. The moving carrier according to claim 6, wherein the moving carrier comprises two of the carry members, and the carry members are in different types.

9. The moving carrier according to claim 1, further comprising:
a second support member crossingly connected with the first support member, wherein the second support member comprises a fifth end portion connected with the bottom frame assembly.

10. The moving carrier according to claim 4, further comprising:
a handlebar frame, wherein the second support member further comprises a sixth end portion, and the sixth end portion is connected with the handlebar frame.

11. The moving carrier according to claim 1, wherein the bottom frame assembly comprises a bottom frame, at least one front wheel assembly, two rear wheel assemblies and a rear wheel axle, the at least one front wheel assembly is disposed on the bottom frame, the first end portion of the first support member is connected with the rear wheel axle, the rear wheel axle is connected with the bottom frame, and the two rear wheel assemblies are disposed at two ends of the rear wheel axle.

12. A folding method of a moving carrier, wherein the moving carrier comprises a bottom frame assembly, a first support member, a link assembly, a second support member, and two carry members, the first support member has a first end portion and a second end portion, the first end portion is connected with the bottom frame assembly, the link assembly is disposed corresponding to the first support member, the link assembly is connected with the second end portion of the first support member, the second support member and the first support member are crossingly connected, the second support member and the first support member are connected with the bottom frame assembly, and the two carry members are correspondingly disposed at two ends of the link assembly, the folding method comprising:
separating the two carry members from the link assembly;
folding the second support member about a folding pivot portion of the second support member toward the bottom frame assembly; and
continuously pushing the folded second support member toward the bottom frame assembly until the second support member is parallel to the bottom frame assembly.

13. The folding method according to claim 12, wherein the link assembly comprises a link member, a first connect member, a second connect member, and two adapter members, the link member is disposed at the second end portion of the first support member, the first connect member and the second connect member are disposed on the link member and connected to the second end portion of the first support member through the link member, the adapter members are disposed corresponding to ends of the first connect member and the second connect member, each of the adapter members has an adapter portion, and in the process of folding the moving carrier, the adapter portions are oriented to the same direction.

14. The folding method according to claim 13, wherein in the process of folding the moving carrier, the first connect member and the second connect member remain in parallel to each other.

15. The folding method according to claim 12, wherein in the step of continuously pushing the folded second support member toward the bottom frame assembly, the second support member drives the first support member and the link assembly to move toward the bottom frame assembly.

16. A moving carrier, comprising:
a bottom frame assembly;
a first support member having a first end portion and a second end portion, wherein the first end portion is connected with the bottom frame assembly; and
at least one link assembly comprising a link member, a first connect member, a second connect member, and two adapter members, wherein the link member is disposed at the second end portion of the first support member, the first connect member and the second connect member are disposed on the link member and connected to the second end portion of the first support member through the link member, the adapter members are disposed corresponding to ends of the first connect member and the second connect member, and each of the adapter members has an adapter portion;
wherein, in the process of changing positions of the first connect member and the second connect member relative to the link member, the adapter portions are oriented to the same direction,
wherein the link assembly further comprises a third connect member, one end of the third connect member connects to the link member, and the other end of the third connect member is slidingly disposed on the first connect member.

17. The moving carrier according to claim 16, wherein the link assembly further comprises a position member, the first connect member further comprises a sliding track, the position member connects to the other end of the third connect member, and the third connect member is slidingly disposed on the sliding track through the position member.

18. The moving carrier according to claim 17, wherein the first connect member further comprises a plurality of position holes, the position member comprises a position portion, and the position portion is disposed corresponding to one of the position holes.

19. The moving carrier according to claim 18, wherein the position member further comprises an elastic member, the position portion is connected with the elastic member, and the position portion is inserted into the position hole via the elastic member.

20. The moving carrier according to claim 19, wherein the position holes are separated with nonequivalent intervals.

* * * * *